(12) United States Patent
Pasquier et al.

(10) Patent No.: US 8,758,001 B2
(45) Date of Patent: Jun. 24, 2014

(54) METHOD FOR CHANGING A MOLD

(75) Inventors: Herve Pasquier, Octeville sur Mer (FR); Damien Cirette, Octeville sur Mer (FR); Nicolas Chomel, Octeville sur Mer (FR); Yves-Alban Duclos, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 119 days.

(21) Appl. No.: 13/391,515

(22) PCT Filed: Sep. 6, 2010

(86) PCT No.: PCT/EP2010/063051
§ 371 (c)(1),
(2), (4) Date: Feb. 21, 2012

(87) PCT Pub. No.: WO2011/026980
PCT Pub. Date: Mar. 10, 2011

(65) Prior Publication Data
US 2012/0164263 A1 Jun. 28, 2012

(30) Foreign Application Priority Data

Sep. 7, 2009 (FR) .................................... 09 56082
Sep. 7, 2009 (FR) .................................... 09 56084

(51) Int. Cl.
*B29C 49/48* (2006.01)
*B29C 33/30* (2006.01)

(52) U.S. Cl.
USPC ........... 425/182; 425/195; 425/522; 425/540; 425/541

(58) Field of Classification Search
CPC .............. B29C 2049/4858; B29C 2049/4864; B29C 2049/4866; B29C 33/306
USPC .......................... 425/182, 195, 522, 540, 541
See application file for complete search history.

(56) References Cited

U.S. PATENT DOCUMENTS 5,232,716 A * 8/1993 Seto et al. ..................... 425/185
5,968,560 A   10/1999 Briere et al.
(Continued)

FOREIGN PATENT DOCUMENTS

| AT | 9 438 U1 | 10/2007 |
| CN | 201 165 049 Y | 12/2008 |
| DE | 36 13 543 C1 | 12/1986 |
| DE | 101 52 050 A1 | 5/2003 |
| EP | 0 893 221 A2 | 1/1990 |

(Continued)

OTHER PUBLICATIONS

French Search Report, dated May 20, 2010, from corresponding French application.

(Continued)

*Primary Examiner* — Robert B Davis
(74) *Attorney, Agent, or Firm* — Young & Thompson

(57) ABSTRACT

Disclosed is a molding device for a machine for producing containers consisting of a thermoplastic material by forming a pre-heated preform using at least one pressurized fluid. The device includes: two mold carriers mounted in such a way that they can move in relation to each other about a rotational axis, between an open position and a closed position; two mold halves that each have a half-impression, are carried by a mold carrier, and are respectively mounted in the associated mold carrier; and fixing element that can dismountably fix each mold half, in its mounted position, to the mold carrier. The element for fixing each mold half to the mold carrier, which are mounted in such a way that they can move at least between a fixing position and a release position, can be controlled as they move between the positions when the mold carriers are in the closed position.

20 Claims, 20 Drawing Sheets

(56) References Cited

U.S. PATENT DOCUMENTS

| | | | |
|---|---|---|---|
| 6,464,486 B1 | 10/2002 | Barray et al. | |
| 8,069,545 B2* | 12/2011 | Stoiber | 29/401.1 |
| 2003/0082262 A1 | 5/2003 | Effenberger | |
| 2004/0202745 A1 | 10/2004 | Tsau et al. | |
| 2005/0238753 A1 | 10/2005 | Arakelyan et al. | |
| 2009/0136613 A1 | 5/2009 | Linke et al. | |
| 2011/0049742 A1* | 3/2011 | Senn | 264/40.1 |
| 2011/0052747 A1* | 3/2011 | Meinzinger | 425/541 |
| 2011/0057342 A1* | 3/2011 | Meinzinger et al. | 425/522 |
| 2011/0059197 A1* | 3/2011 | Duclos et al. | 425/150 |
| 2012/0148703 A1* | 6/2012 | Duclos | 425/214 |
| 2012/0161349 A1* | 6/2012 | Pasquier et al. | 264/39 |

FOREIGN PATENT DOCUMENTS

| | | |
|---|---|---|
| EP | 0 821 641 B1 | 8/2000 |
| FR | 2 646 802 A1 | 11/1990 |
| FR | 2 659 265 A1 | 9/1991 |
| FR | 2 764 544 A1 | 12/1998 |
| JP | 10 180813 A | 7/1998 |
| WO | 2004/018181 A1 | 3/2004 |
| WO | 2007/012308 A1 | 2/2007 |

OTHER PUBLICATIONS

International Search Report, dated Oct. 28, 2010, from corresponding PCT application.

* cited by examiner

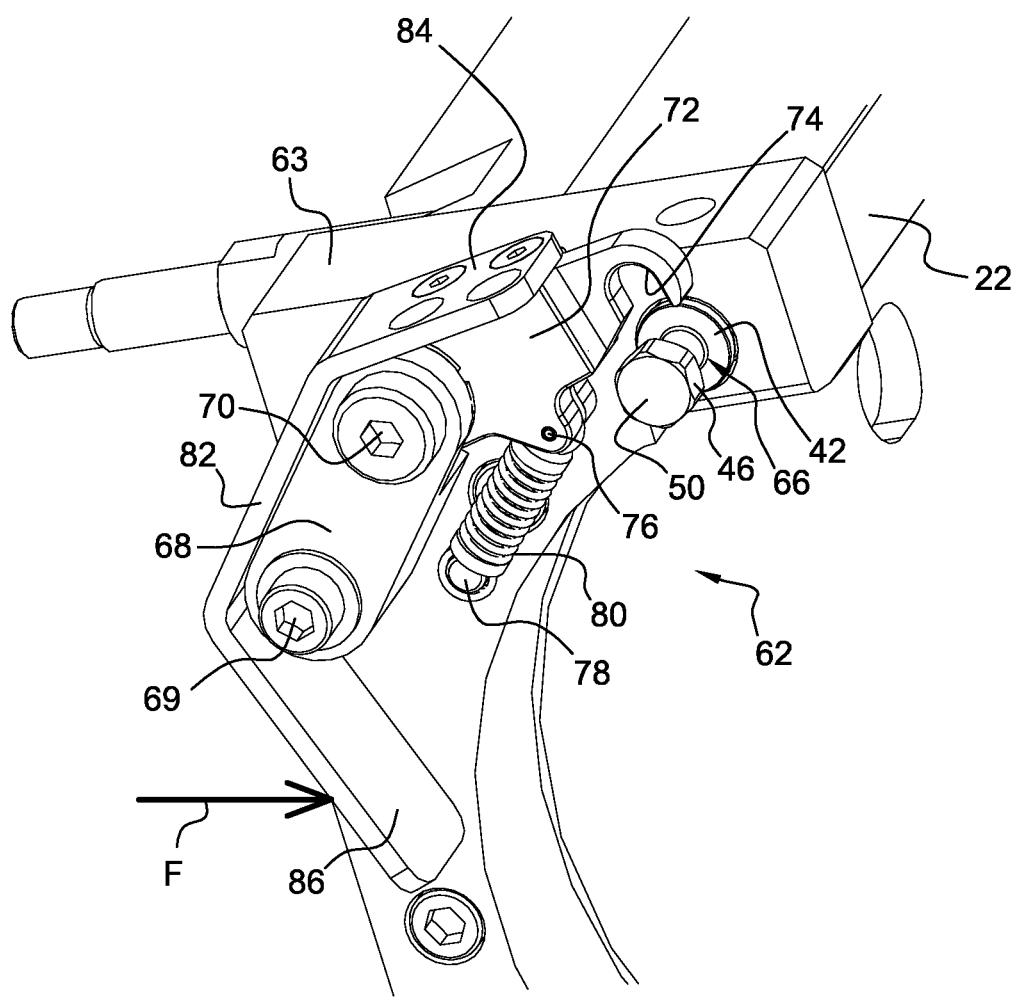
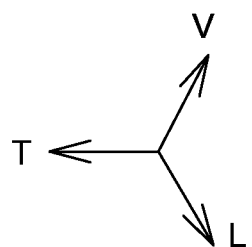
Fig. 8

METHOD FOR CHANGING A MOLD

The present invention concerns a molding device for a machine for manufacturing thermoplastic material containers, notably bottles.

The present invention concerns more particularly a molding device for a machine for producing containers consisting of a thermoplastic material by forming a pre-heated preform using at least one pressurized fluid.

There are known in the art molding devices intended to equip machines for manufacturing containers, notably but not exclusively so-called "rotary" machines including a carousel provided circumferentially with a particular number of identical blowing stations.

Plastic material containers such as bottles, flasks, etc. are manufactured therein from preforms or blanks pre-heated in a heat treatment oven.

In the manufacturing phase, depending on the number of mold imprints, one or more preforms are thus fed to a station of the machine to be introduced into a molding device associated with forming means that employ at least one pressurized gas and/or liquid fluid.

The preform is formed (or shaped) for example by blowing or by drawing-blowing by means of a pressurized gas, such as air, or even at least in part by means of a pressurized liquid.

In a "rotary" manufacturing machine, each so-called "book-like opening" molding device includes at least one mold constituted of two half-molds supported by respective mold-carriers that are mounted to be mobile relative to each other about a generally vertical rotation axis.

Each half-mold is generally received in a complementary recess of the associated mold-carrier to which the half-mold is removably fixed by fixing means in order to enable demounting with a view to changing the mold.

A change of mold is in particular required to manufacture containers of different shapes and/or sizes or to replace them in the event of damage to and/or wear of the half-molds.

To reduce production costs as much as to reduce the time necessary for such demounting of the mold various improvements to such "book-like opening" molding devices have already been proposed in the document EP-B1-0 821 641.

Firstly, means for regulating the temperature of the imprints of each half-mold are produced in a part separate from the half-mold so that each half-mold comprises (using the terminology of the above document) on the one hand a shell-carrier provided with temperature regulating means and adapted to be supported by the mold-carrier and on the other hand a shell provided with a half-imprint of the container to be produced that is adapted to be removably fastened to the shell-carrier by means of fixing means of a fixing device.

Then, the means for fixing the shell to the shell-carrier are disposed on respective edges of the shell and the half-shell parallel to the main axis of the imprint.

These fixing means include in particular means for screwing a clamping bar to a joint face of the shell-carrier. The clamping bar includes clamping lugs projecting from the joint face of the half-mold for fixing the shell firmly to the shell-carrier.

With such fixing means, the mounting and demounting steps for changing the molds of a molding device equipping a station of a rotary manufacturing machine, also known as a "blow-molding machine", are executed by at least one operator and the shell is fitted with a circular movement.

To be more precise, the shell is introduced into the corresponding recess of the shell-carrier, the edge of the mold situated on the same side as the articulation means between the mold-carriers is first moved into position and then, continuing the circular movement, the other edge is moved into position to proceed to fixing by means of the fixing means, which are actuated at this point.

Thus the mounting and demounting operations require the use of tools, such as screwdrivers, to operate the fixing means with the operator facing the mold-carriers in the open position.

One shell and then the other shell are successively demounted and the new shells are mounted one after the other.

It is readily apparent that such a mounting and/or demounting operation is delicate and that "book-like opening" type molding devices have specific features appropriate in particular to address access problems faced by the operator who has to use these tools and to maneuver precisely each shell (or half-mold).

Moreover, despite the improvements made to the fixing means, the aim is to reduce further the total time necessary for changing a mold including mounting and demounting the half-molds.

The immobilization of the machine during these operations represents a high cost because of the accompanying complete cessation of production, the mold changing operations occurring more or less frequently depending on the users.

This is one of the reasons for which ongoing aim is to reduce further the times necessary to carry out the steps of mounting/demounting the half-molds during a change of mold.

To this end, the invention proposes a molding device for a machine for manufacturing thermoplastic material containers by forming a pre-heated preform by means of a pressurized fluid, the molding device including:
  two mold-carriers mounted to be mobile relative to each other about a rotation axis O between an open position and a closed position,
  two half-molds which, each provided with a half-imprint and carried by a mold-carrier, are mounted in the respective associated mold-carriers, and
  fixing means adapted to fix each half-mold occupying a mounted position in a demountable manner to the mold-carrier,
  characterized in that the means for fixing each half-mold to the mold-carrier, mounted to be mobile between at least a fixing position and a release position, are adapted to be driven in movement between said positions when the mold-carriers are in the closed position.

Thanks to the invention it is possible to operate the fixing means from the exterior of the molding device so as selectively to fix the half-molds to the mold-carrier or to release them therefrom regardless of the open or closed position occupied by the mold-carriers.

By comparison with the prior art fixing means in which the mold-carriers must necessarily be in the open position to allow access to the fixing means, the fixing means of the invention are adapted to be actuated independently of the open or closed position of said mold-carriers.

The fixing means of the invention advantageously enable fixing or release of each half-mold easily and without precise manipulation of tools, the fixing means being actuated rapidly and simply whether the mold-carriers occupy the open position or the closed position.

Thanks to the invention, it is possible to carry out the operations of mounting or demounting each of the elements forming the mold as explained hereinabove with regard to the prior art, for example if only one of the edges of the shell is provided with means according to the invention and the other edge with conventional means, the operation then being carried out successively for each of the shells and the mold bottom.

It is advantageously equally possible, when both edges of each shell are equipped in accordance with the invention, to carry out in a single operation the mounting or demounting of a unitary subassembly including for example the two half-shells trapping the mold bottom, which subassembly can then be removed in a single operation as soon as the mold-carriers are opened thanks to the fixing means of the invention that allow removal or introduction of each shell from or into the recess of each shell-carrier by a movement in translation.

In a manner that is not limiting on the invention, the fixing means proposed in the present application are so-called mechanical fixing means, more particularly characterized by the use of a member for actuating the fixing means mobile between the fixing and release positions, which actuator member is adapted to be driven by associated means of a drive system, including when the mold-carriers are in the closed position.

The drive system provided with means for actuating the fixing means is preferably not integrated into the molding device but produced in the form of an independent device adapted to be disposed, temporarily or permanently, in an operating position in a particular area of the container production machine.

According to other features of the invention:

the fixing means include at least one member for actuating the fixing means adapted to be driven in movement from outside the molding device to cause the fixing means to release each half-mold from the mold-carrier or to fix it thereto regardless of the open or closed position of the mold-carriers of the molding device;

the respective fixing means are at least in part integrated into the interior of the molding device and are disposed between an edge of the half-mold and an edge of the mold-carrier that are parallel to the rotation axis in such a manner as to fix the half-mold to one and/or the other of its edges;

the actuator member includes a drive part that projects entirely or partly out of the molding device;

the member for actuating the fixing means is adapted to be driven selectively by a drive system to cause it to slide between at least said fixing and release positions of each half-mold;

the respective fixing means include at least one fixing element that is rigidly fastened to each half-mold and at least one other fixing element, complementary to said element, is adapted to be moved by the actuator member;

said at least one fixing element rigidly fastened to each half-mold is a first fixing element of male type and said at least one other fixing element connected to the actuator member is a second fixing element of female type, such as a hook;

said at least one fixing element rigidly fastened to each half-mold is a second fixing element of female type, such as a detent or a notch, and said at least one other fixing element connected to the actuator member is a first fixing element of male type, such as a lug;

the actuator member includes at least two fixing elements one of which is connected to said member with a spring member disposed between them to form a connection with play adapted to guarantee correct positioning of each second element with the associated first element;

the drive system is adapted to load the actuator member to cause selective movement of said actuator member between at least:

the fixing position in which the second element cooperates with the first element of the half-mold in order to fix the half-mold and the mold-carrier by pressing the half-mold against the mold-carrier, and the release position in which the second element is retracted in order not to interfere with the first element of the half-mold, in particular when the half-mold occupies said mounted position;

the fixing means include elastic return means that urge the actuator member toward the fixing position so that said member is returned automatically toward said fixing position;

the molding device includes a locking system associated with the fixing means which is actuated selectively to lock the actuator member including the second element of the fixing means in the fixing position or the release position;

the locking system includes drive means adapted to cause movement of at least one locking latch that is mounted to be mobile between:

an unlocked position in which the locking latch is retracted to leave the actuator member free to slide, notably between the fixing and release positions, and a locked position in which the locking latch cooperates selectively with a first detent or with a second detent of the actuator member, said first and second detents respectively corresponding to the fixing position and the release position of the actuator member;

the locking system includes a spring member for returning the locking latch from the unlocked position to the locked position so that the locking latch is returned automatically toward the locked position by said spring member;

the second detent of the actuator member and the locking latch are conformed to have, in the sliding direction, play adapted to allow movement of the member beyond the release position in order selectively to drive via the drive system means for unsticking the half-mold from the mold-carrier;

the unsticking means are constituted by part of the second element forming a ramp that is adapted to exert an unsticking force on the first element when the drive system loads the actuator member to cause it to slide beyond the release position by an overtravel determined by said play of the locking latch in the second detent;

the molding device includes rotation locking means adapted to lock rotation of the actuator member;

part of the rotation locking means for the actuator member is connected to said member to move therewith and is adapted to cooperate with another part rigidly fastened to the mold-carrier.

Other features and advantages of the present invention will become apparent on reading the following detailed description to assist understanding of which reference should be made to the drawings, in which:

FIG. 1 is a perspective view that shows the molding device in place on a station of a container manufacturing machine and that shows mold-carriers including half-molds in their closed position;

FIG. 2 is a perspective view that shows the main parts of the molding device from FIG. 1, which includes fixing means of a first embodiment of the invention, and that shows the mold-carriers in the open position, half-molds each constituted of a shell-carrier mounted in a recess of a mold-carrier and a shell, the two shells completed by a mold bottom forming a unitary subassembly that can be removed from between or introduced between the mold-carriers with a view to demounting it or mounting it;

Figure 7:
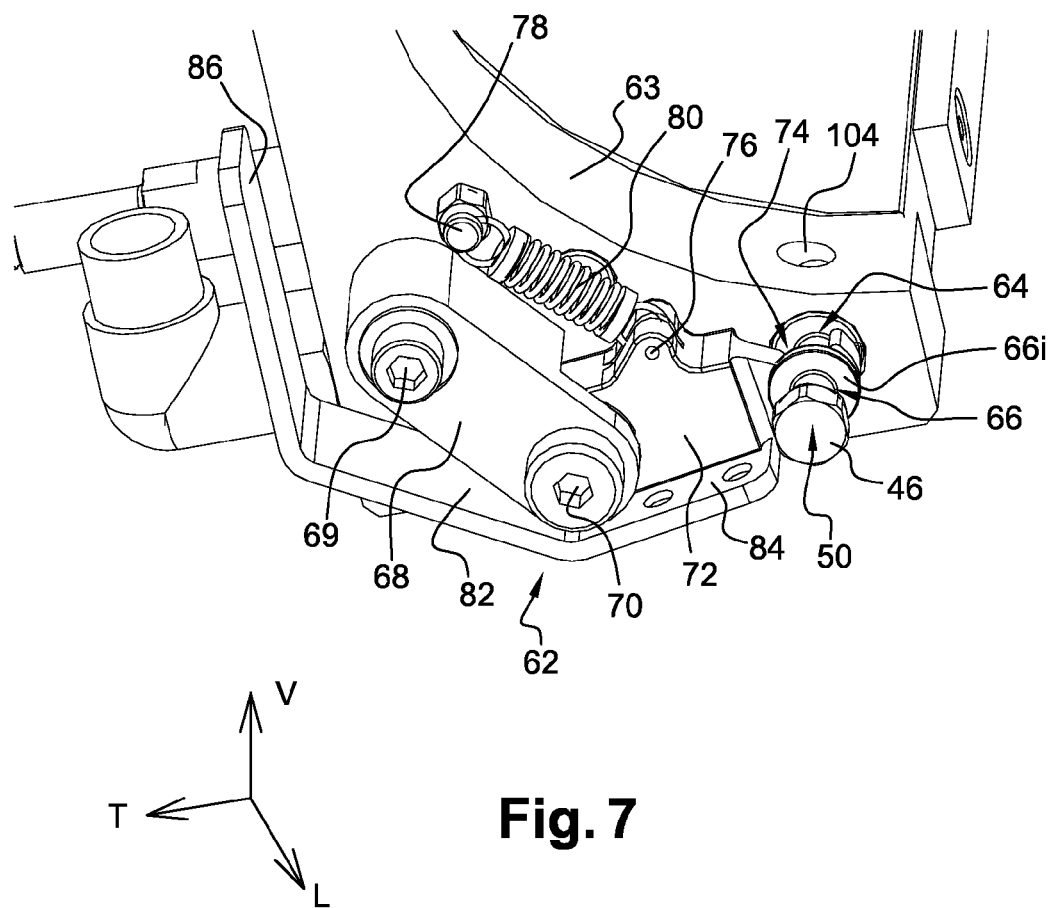
Figure 9:
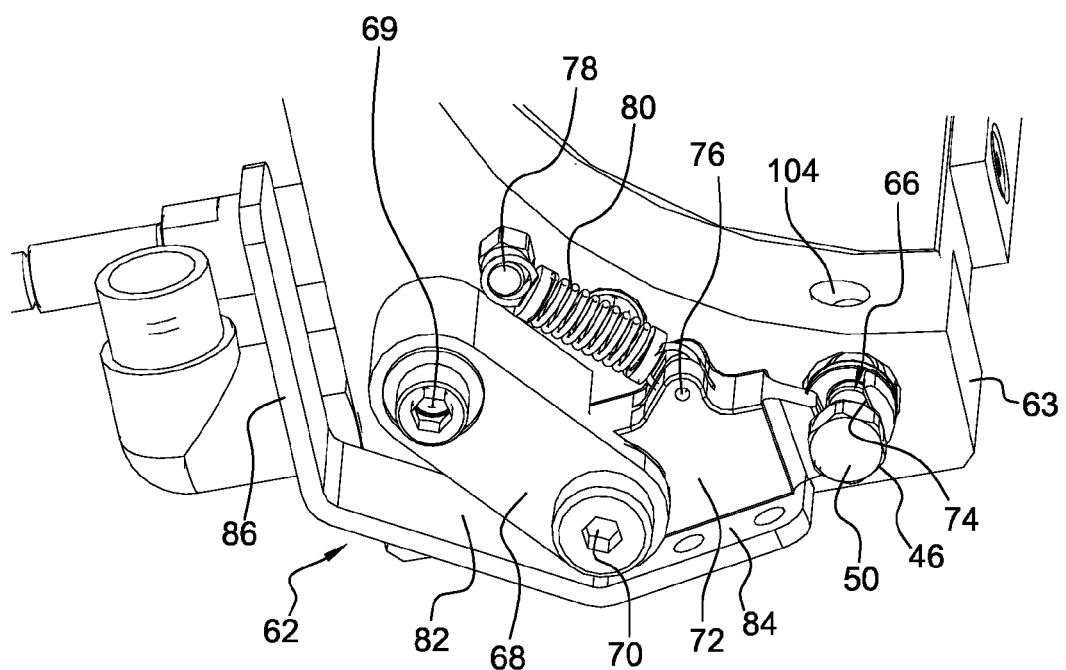
Figure 10:
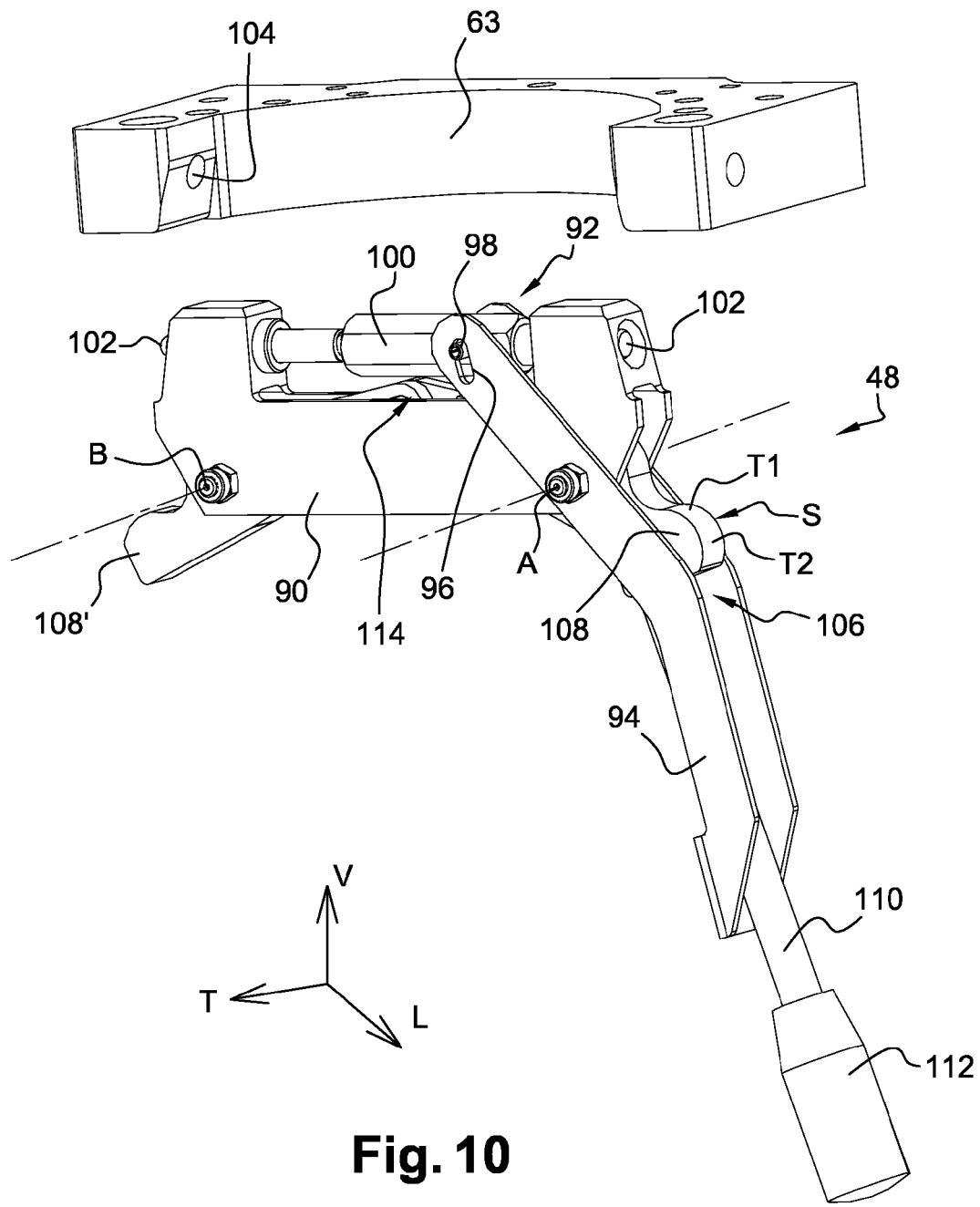
Figure 11:
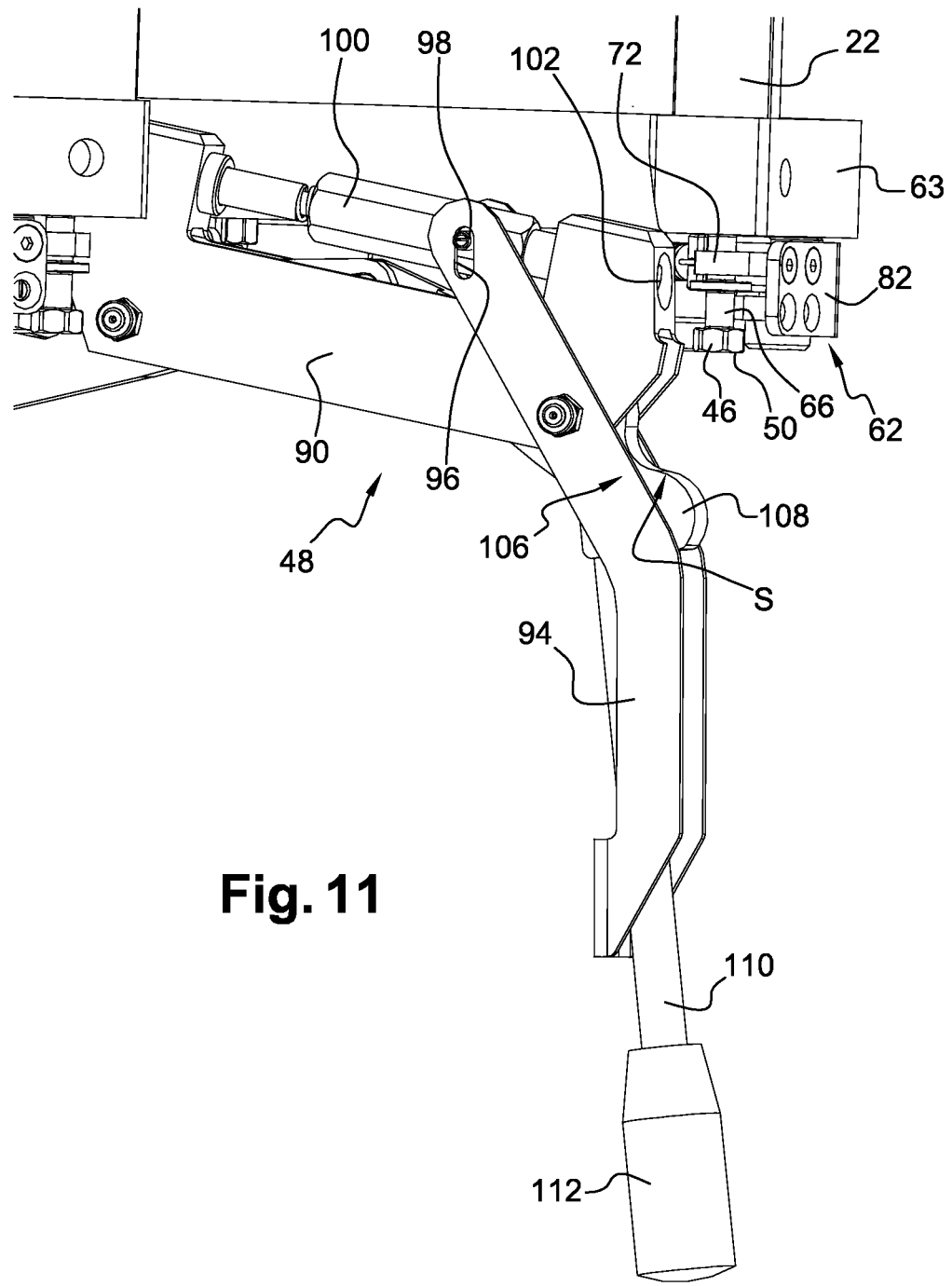
Figure 12:
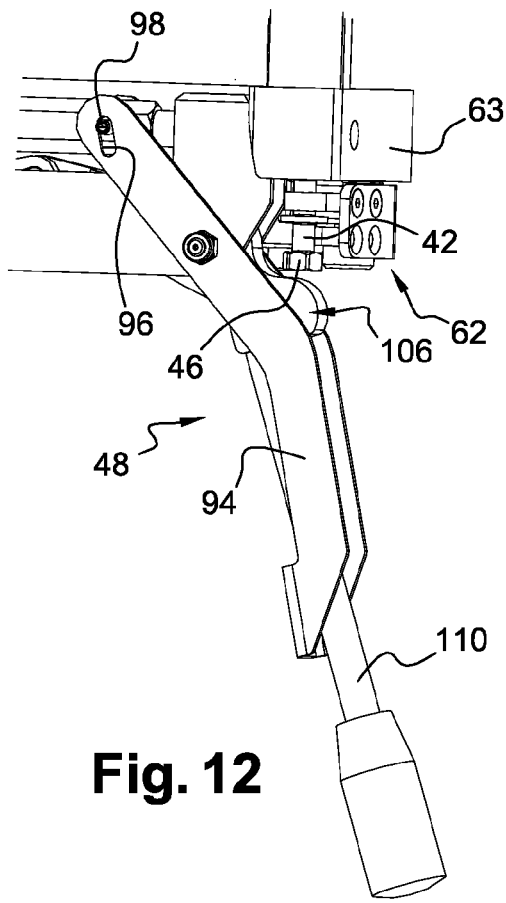
Figure 13:
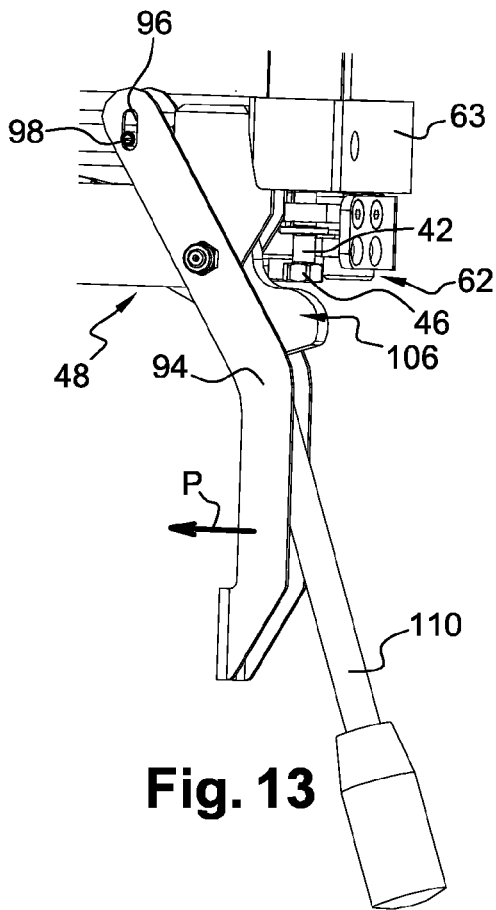
Figure 14:
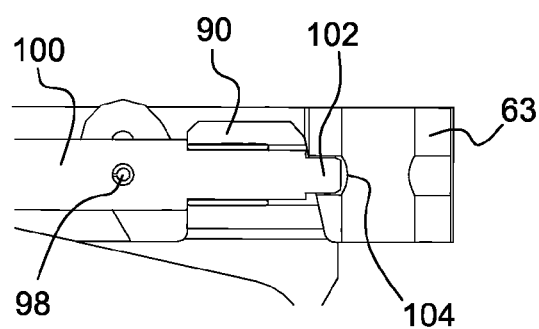
Figure 15:
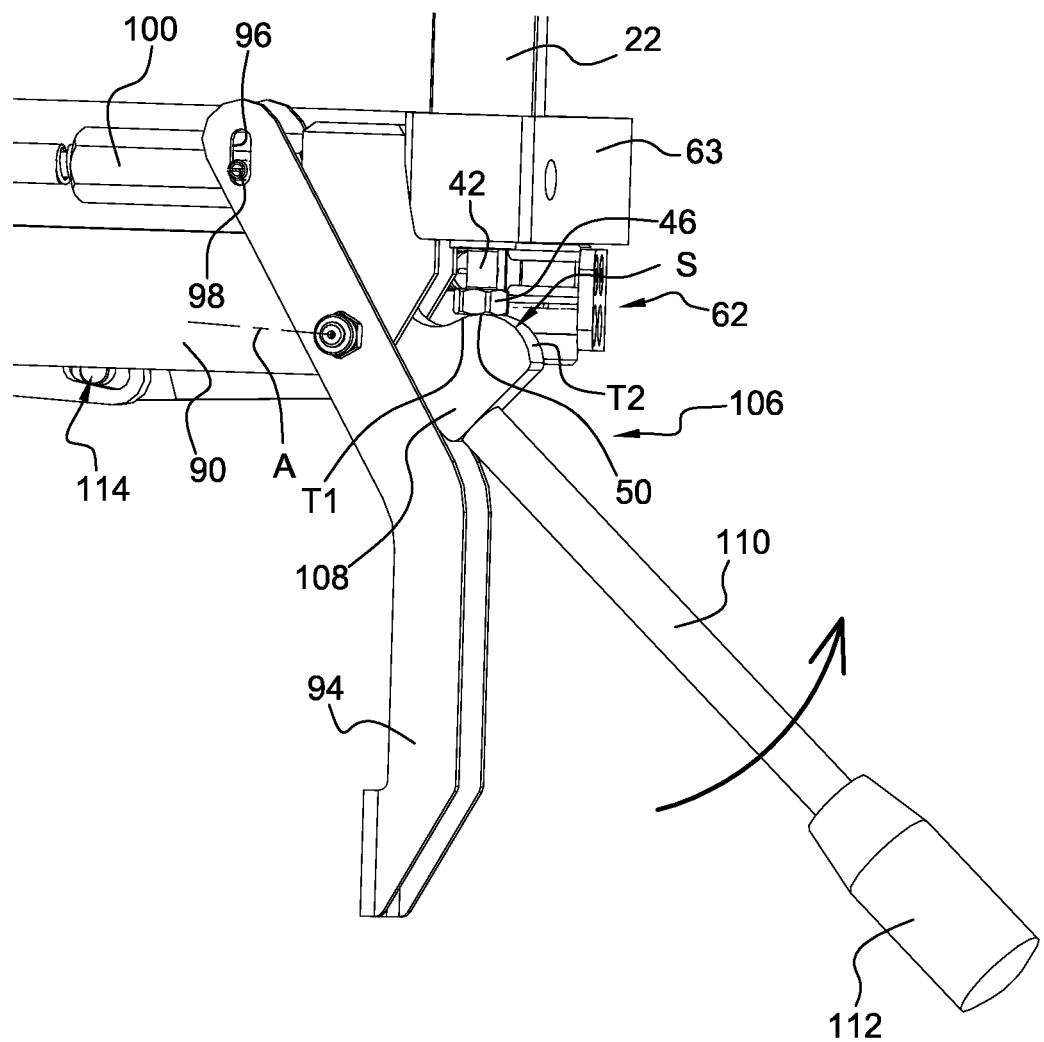
Figure 16:
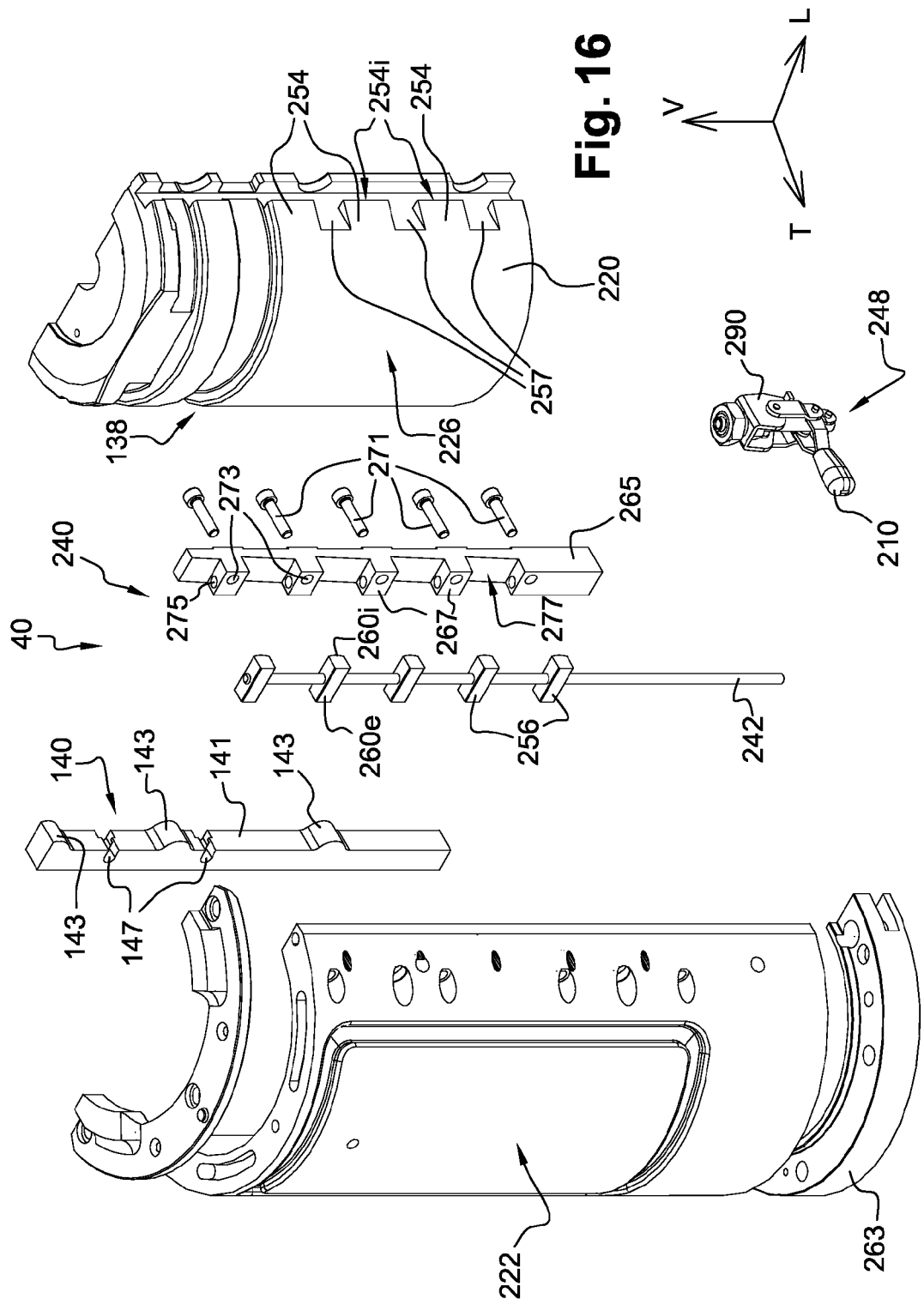
Figure 17:
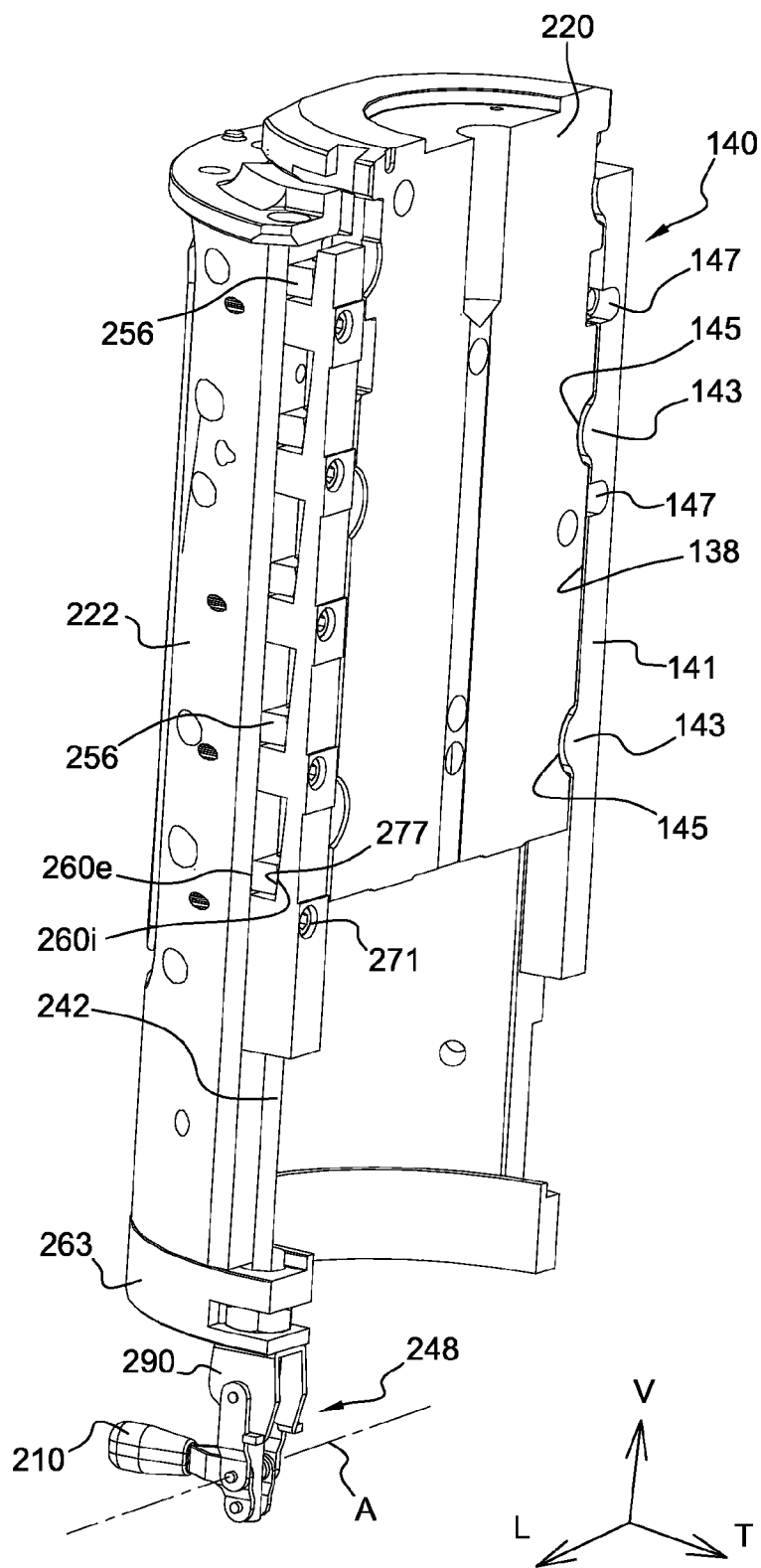
Figure 18:
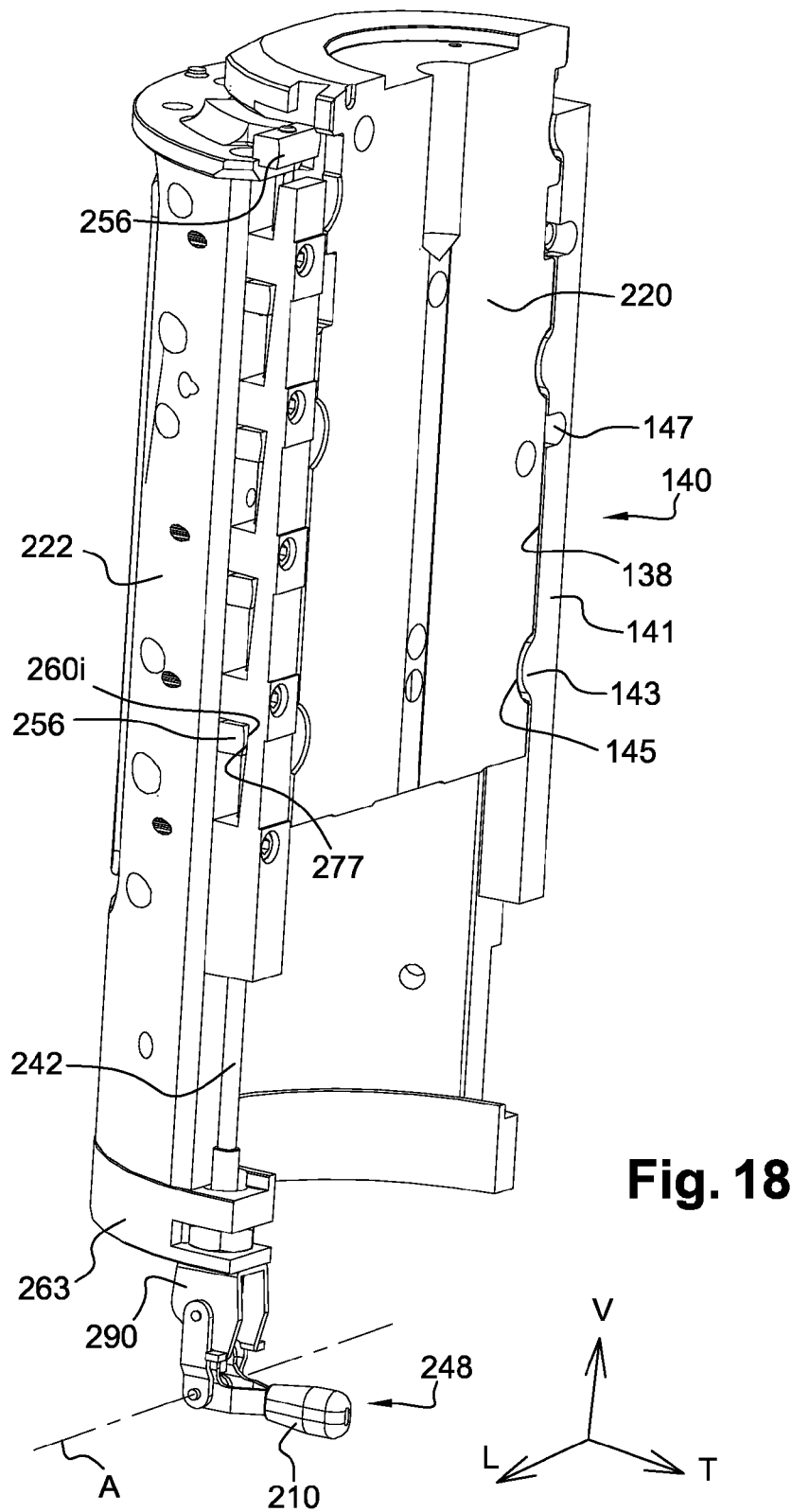
Figure 19:
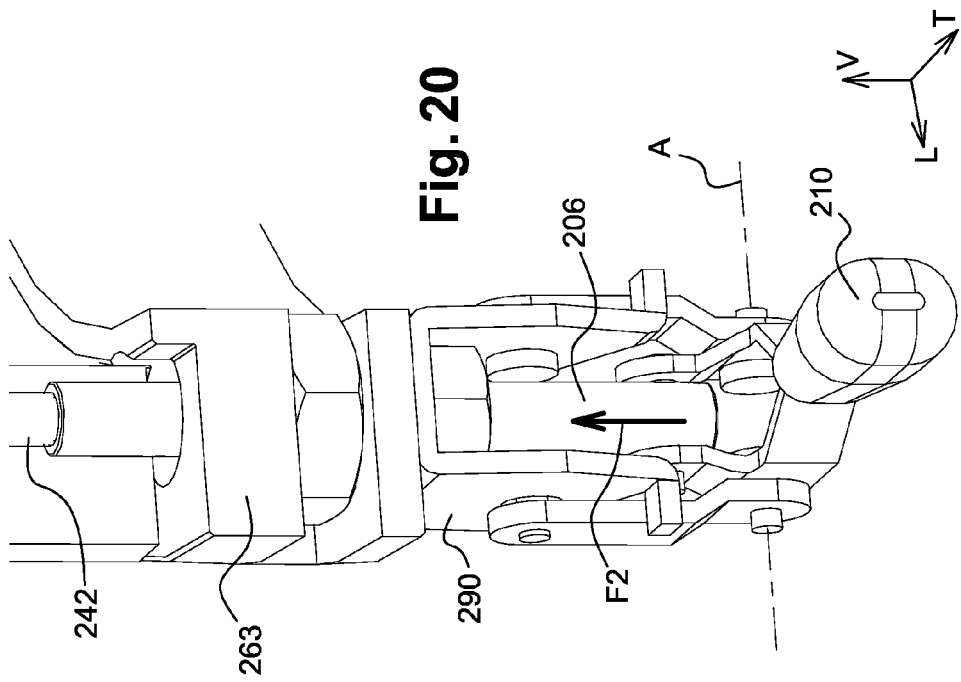
Figure 20:
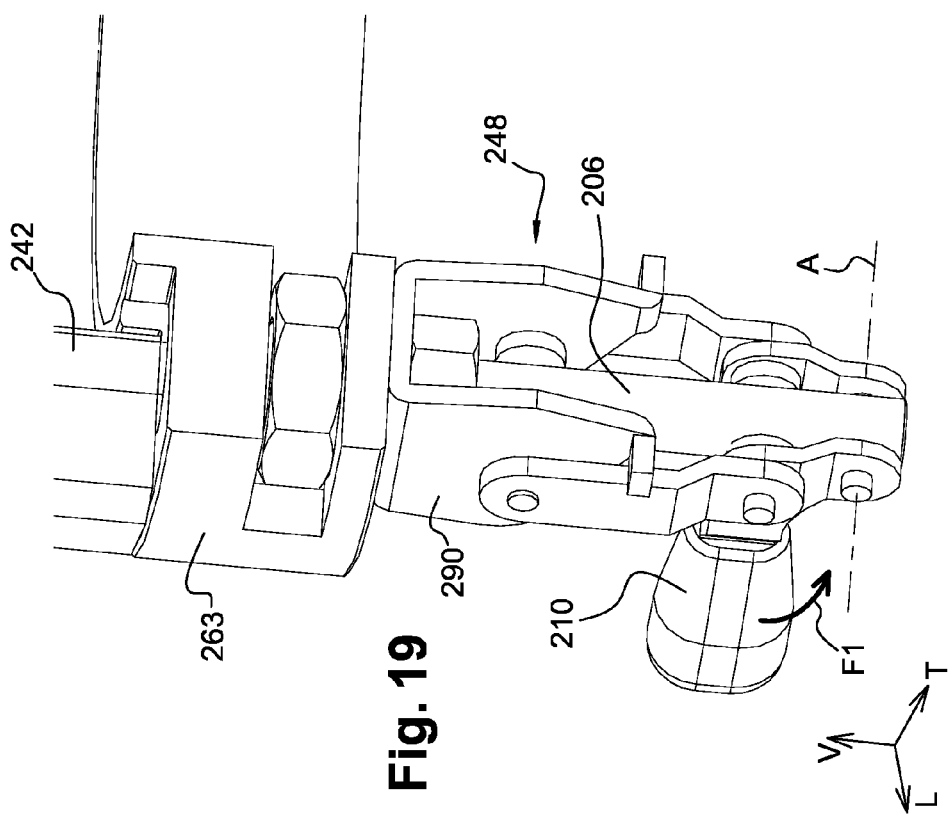
Figure 21:
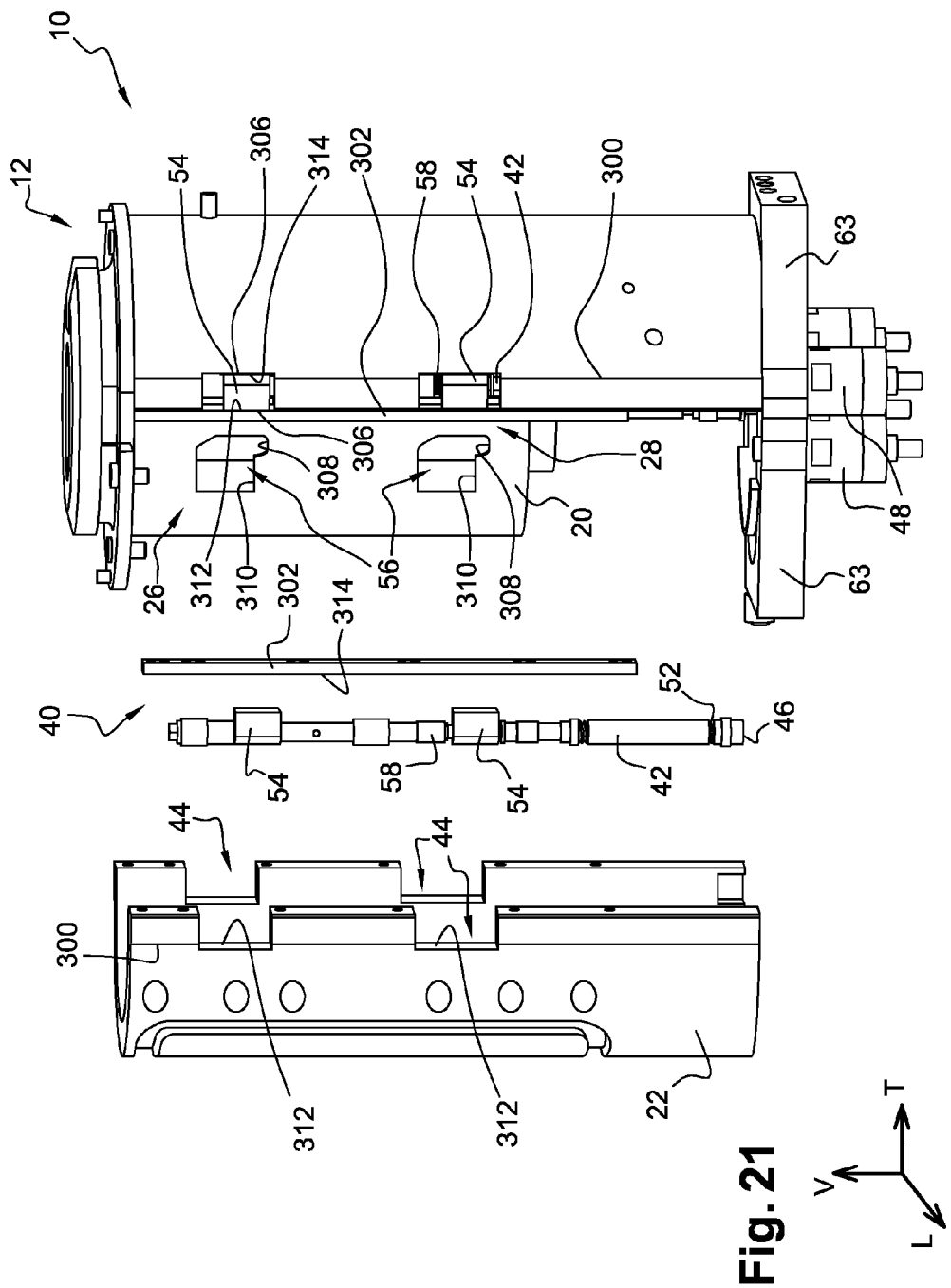
Figure 22:
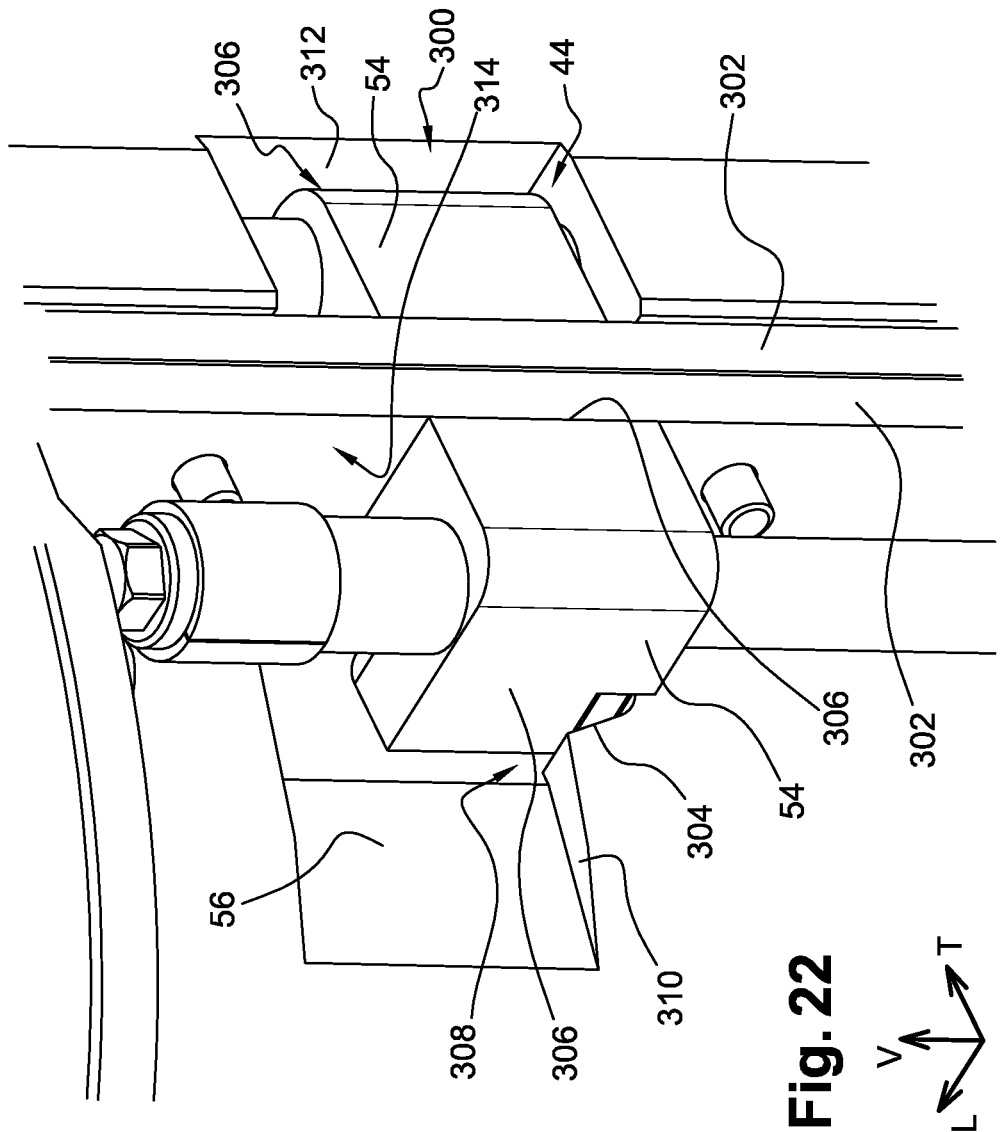

FIGS. 7 to 9 are perspective views that show the molding device, as seen from below, showing one embodiment of a locking system that may be associated with the actuator member of the fixing means, FIGS. 7, 8 and 9 successively showing said system in the locked position of the member occupying the release position, in the unlocked position, and in the locked position of the member occupying the fixing position;

FIG. 10 is a perspective view that shows one embodiment of a drive system including means for actuating the member and that shows said device in the free state, i.e. before it is attached to a plate which, here seen from above, is fastened to the shell-carrier;

FIG. 11 is a perspective view that shows the drive system in the process of being mounted on the plate in order to position it and to proceed to its attachment to the plate;

FIGS. 12 and 13 are perspective views that show the drive system in a particular position relative to the plate, this being a preliminary position from which the attachment of the device to the plate is achieved by moving the drive member of the means for attaching the device, as shown by comparing FIGS. 12 and 13;

FIG. 14 is a sectional view that shows part of the drive system when attached and in its operating position shown in FIG. 13 and an attachment finger inside the complementary hole in the plate;

FIG. 15 is a perspective view which, by comparison with FIG. 13 showing the working position of the drive system in which the actuator means occupy a rest position, shows said actuator means in an active position obtained by moving the lever to cause the cam to cooperate with the drive part of the actuator member and thus to bring about the release of the fixing means after first having taken care to unlock the locking system;

FIG. 16 is an exploded perspective view that shows a half-mold including a shell and a shell-carrier adapted to be fixed together by fixing means produced on one of its edges in a second embodiment of the invention;

FIGS. 17 and 18 are perspective views that show the shell in the mounted position and then fixed to the shell-carrier and that show the fixing means of the second embodiment respectively in the fixing position and in the release position;

FIGS. 19 and 20 are perspective views that show one embodiment of a drive system adapted to actuate the actuator member of the block type fixing means of the second embodiment of the invention; and FIGS. 21 and 22 are respectively perspective general and detail views that show a third embodiment of the fixing means.

The remainder of the description adopts, without this limiting the invention, longitudinal, vertical and transverse orientations referred to the orthogonal frame of reference (L, V, T) shown in the figures, the longitudinal and transverse directions being defined in fixed manner relative to the mold-carriers so that the open or closed position occupied does not impact on said orientations.

By convention, there will be used, without this being limiting on the invention, the terms "front" and "rear" with reference to the longitudinal orientation, "upper" and "lower" with reference to the vertical orientation, and finally "left" or "right" and "interior" or "exterior" with reference to the transverse orientation more particularly oriented from the exterior of the mold toward the interior of the mold.

In the remainder of the present description, without this being limiting on the invention, there are used interchangeably the terms "shell" or "half-mold" to designate the first part including the half-imprint and, correspondingly, "shell-carrier" or "mold-carrier" to designate the second part receiving the first part, the shell-carrier remaining fastened to the mold-carrier during a change of mold being equivalent to a one-piece assembly.

A first embodiment of the fixing means of the invention shown in FIGS. 1 to 6 is described next, as well as an embodiment of a locking system shown in FIGS. 7 to 9 and an actuator device shown in FIGS. 10 to 15.

Figure 1:
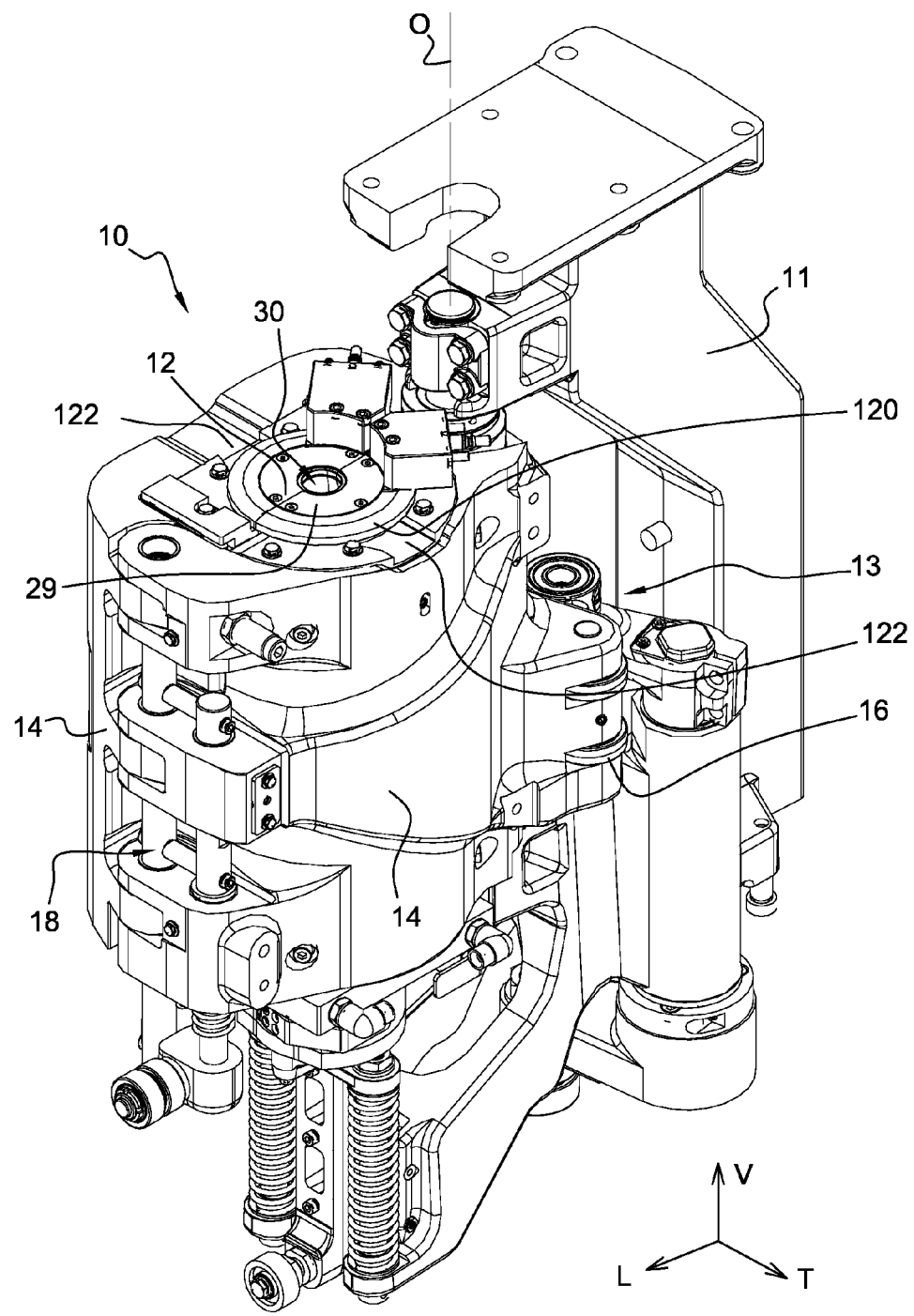

FIG. 1 shows a molding device 10 for a machine (not shown) for manufacturing thermoplastic material containers, the molding device 10 carried by a bracket 11 forming part of a forming station of such a blow-molding machine, for example.

The blow-molding machine includes a carousel provided circumferentially with a particular number "N" of forming stations including means (not shown) associated with the molding device 10 for transforming the preform into a container, for example blowing means or drawing-blowing means disposed above the molding device 10.

The molding device 10 is thus adapted to equip a machine for manufacturing thermoplastic material containers, in particular bottles, by forming a pre-heated preform by means of a pressurized fluid.

The molding device 10 shown in FIG. 1 nevertheless represents only one nonlimiting example of the type of molding device 10 which, equipping a "rotary" machine of this kind, is adapted to receive fixing means produced in accordance with the teachings of the invention.

As may be seen in FIG. 1, the molding device 10 includes at least one mold 12 constituted of two half-molds, namely a left-hand half-mold and a right-hand half-mold.

The two half-molds forming the mold 12 are adapted to be supported by respective mold-carriers 14, also respectively left-hand and right-hand, that are mounted so as to be mobile relative to each other about a rotation axis O.

To this end, the molding device 10 includes a fixing device including fixing means that are adapted to fix in a demountable manner to the mold-carriers 14 each half-mold occupying a mounted position or central reference position.

The molding device 10 shown in FIG. 1 is intended to equip a blowing station of a "rotary" type manufacturing machine, i.e. one generally including a carousel at the circumference of which are disposed stations each comprising a molding device 10 associated for example with blowing or drawing-blowing means (not shown).

For more details of the forming means such as the aforementioned blowing or drawing-blowing means, sometimes referred to as and produced in the form of a blowing nozzle, see for example the document FR-2 764 544.

In the example shown, the mold-carriers 14 are constituted in the form of two supporting structures mounted to pivot about a common rotation axis O, the rotation axis O here extending vertically according to the frame of reference (L, V, T).

Each mold-carrier 14 includes, in the longitudinal direction, a rear part that is complementary to the rear part of the other mold-carrier and that is conformed to interpenetrate with the latter in order to form an articulation 13, such as a hinge, the two parts whereof nevertheless pivot about the rotation axis O.

Alternatively, only one of the mold-carriers is mobile and the other mold-carrier is fixed, the mobile mold-carrier being driven to move between said open and closed positions.

Figure 2:
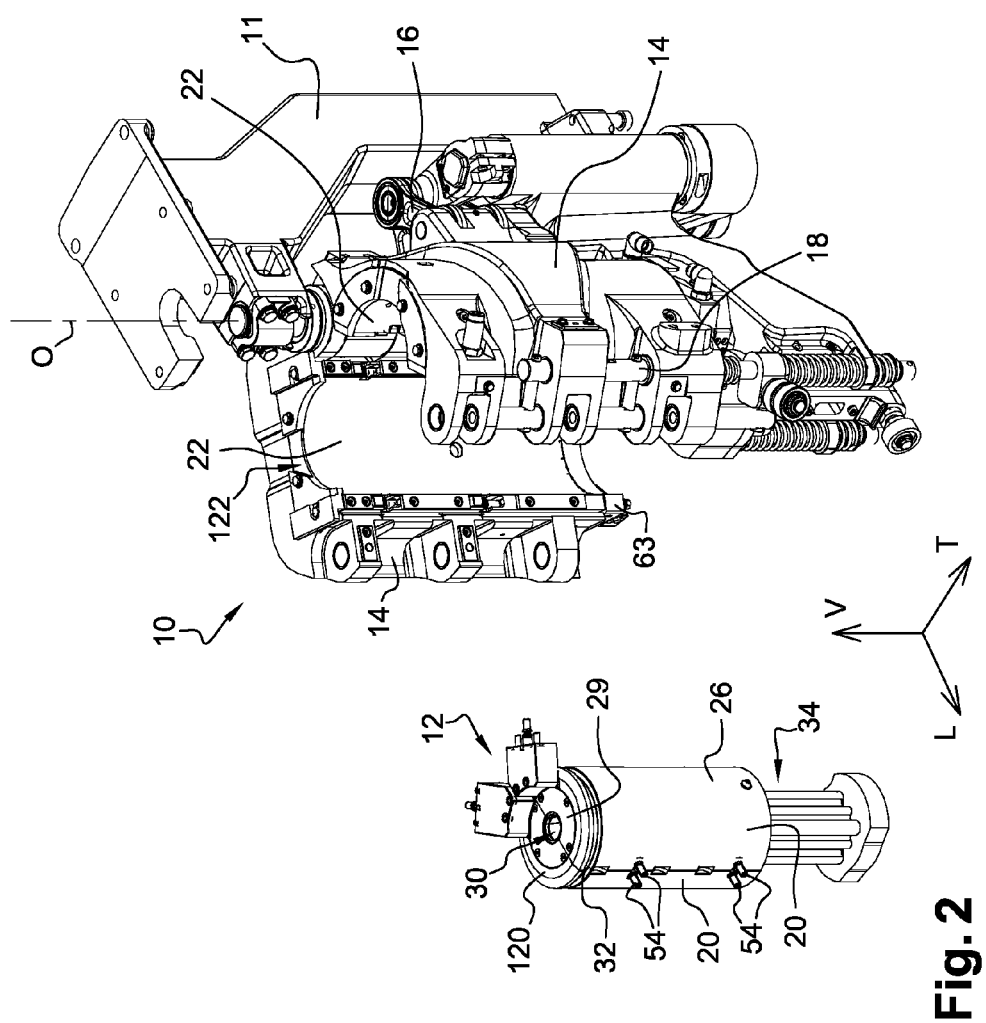

The mold-carriers 14 can then be moved away from each other by pivoting about the axis O and are consequently mounted so as to be mobile in rotation between at least a closed position (FIG. 1) and an open position (FIG. 2).

Given the kinematics of the mold carriers 14, such a molding device 10 is also known as a "book-like opening" mold.

In known manner, the mold-carriers 14 are driven between the open and closed positions by a system 16 of traction drive arms (see FIG. 2) one end of which is articulated to the mold-carriers 14 and the other end of which is connected to associated drive means, preferably of the roller and cam type.

This type of articulation of the mold-carriers 14 and the associated opening and closing drive means are as described in the document WO-A1-2004/018181, for example, which may advantageously be referred to for more details.

The molding device 10 further includes a lock 18 disposed longitudinally in the front part, i.e. opposite the pivoting articulation about the rotation axis O, and adapted to lock the two mold-carriers 14 in the closed position.

This kind of lock 18 is also known in the art and will therefore not be described in more detail, said lock 18 notably having the function of preventing inopportune opening during operations of transformation by injection of a pressurized fluid, such as compressed air in the case of blow-molding, where the final pressures may reach 40 bar.

For more details on the structure and the operation of a lock 18 see for example the document FR-2 646 802.

That is merely one example, of course, because there exist numerous different but equivalent locks able to provide the locking function.

Figure 3:
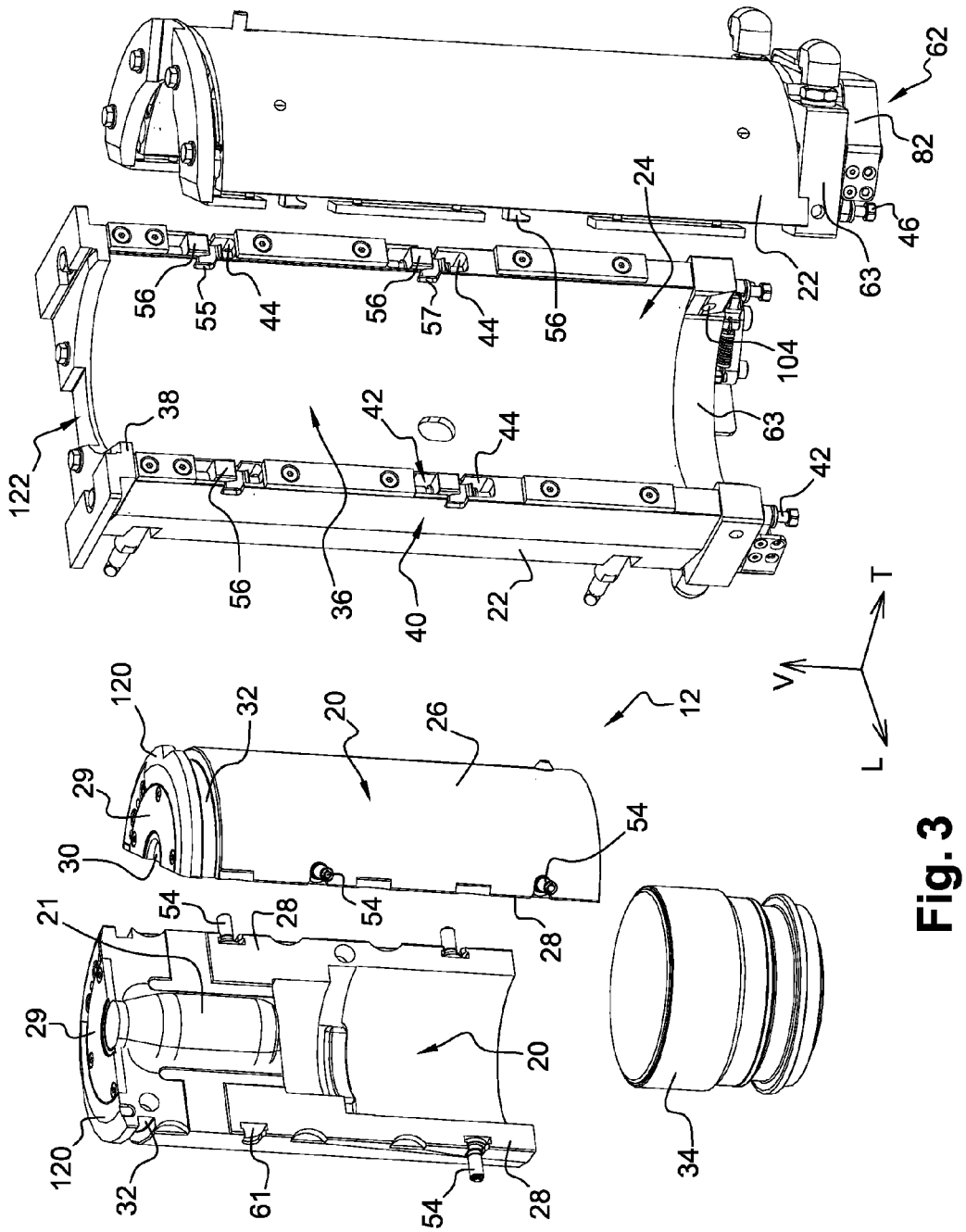
FIG. 3 is an exploded perspective view that shows the half-molds of the first embodiment which, provided with fixing means of the invention, are respectively constituted here of the two shells with which is associated a mold bottom and two shell-carriers adapted to be mounted on the mold-carriers and disposed between the latter and the shells.

As shown in FIG. 3, the molding device 10 is here preferably of the type in which each half-mold of the mold 12 is produced in two separate parts, namely a shell 20 provided with the half-imprint 21 of the container to be produced and a shell-carrier 22 adapted to support the shell 20 and to be fastened to one of the mold-carriers 14.

This design of the mold 12 has numerous advantages, notably as described in the aforementioned document EP-B1-0 821 641.

Alternatively, each half-mold may nevertheless be produced in one piece adapted to be fixed to one of the mold-carriers 14 by fixing means.

Each shell 20 includes a half-imprint 21 of the finished container that is recessed into an internal face 24. Here each internal face 24 is a plane vertical face that is formed by the section face of the cylinder forming the mold 12.

During manufacture, when the internal faces 24 lie against each other in a vertical molding plane to form the imprint of the container to be produced, the independent shells 20 (or half-shells) are then said to be in the joined position.

Each shell 20 has an external face 26 opposite the internal face 24 which has the overall shape of a circular half-cylinder substantially coaxial with the vertical axis X of the imprint of the container.

Centering means are advantageously provided to center the mold 12 in the circumferential direction relative to the mold-carriers 14, such as a peg projecting from the external face 26 of the shell 20 adapted to enter a complementary hole in the internal face of the shell-carrier 22.

Each shell 20 has two vertical rectilinear edges 28 which the internal face 24 and the external face 26 of the shell 20 join.

When the mold-carriers 14 are in the closed position, the two joined shells 20 together define an upper horizontal face having a central opening 30 intended to enable introduction of the preform.

The upper face of each shell 20 is preferably formed by a separate plate 29 rigidly attached to each shell 20. In the closed position, the joined plates 29 define a horizontal surface with which comes into contact the lower end of a nozzle (not shown) comprising the blowing or drawing-blowing means.

The upper parts of the shells 20, just below the upper horizontal face, also include a groove 32 that extends continuously in the circumferential direction around the two shells 20 when they are joined to produce the imprint.

If the container to be manufactured has a bottom of complex shape, in particular a petal shape, problems are then liable to occur when removing it from the mold.

This is why there is advantageously provided a separate mold bottom, separate from the half-molds or, as in the embodiment shown in FIG. 3, separate from the shells 20, said mold bottom including an imprint (not shown) of the bottom of the container complementary to the half-imprints 21.

The shapes of the shell 20 and the shell-carrier 22 are advantageously complementary so that the external face 26 of the shell 20 and the internal face 36 of the shell-carrier 22 are completely or partly in contact, pressed together, in particular to enable heat transfer by outward transverse conduction, i.e. from the shell 20 to the shell-carrier 22.

Each shell-carrier 22 is advantageously provided with interior conduits and associated connectors to allow circulation of a cooling (or heating) fluid in the shell-carrier 22 including the internal wall 36 against which the shell 20 is pressed.

The molding device 10 advantageously further includes positioning means operative between the shell-carrier 22 and the shell 20 together forming a half-mold, notably by cooperation of shapes such as ribs/grooves that cooperate with each other for positioning at least in the vertical direction.

In this embodiment the molding device 10 includes an upper part, here fastened to the shell-carrier 22, an internal edge 38 of which penetrates into the circular groove 32 of each shell 20.

The molding device 10 includes a fixing device provided with fixing means 40 adapted to fix in a demountable manner to the mold-carrier 14 each half-mold occupying a mounted or central reference position.

In this embodiment, the shell-carrier 22—although removable—is permanently mounted on the mold-carrier 14 and fastened thereto if it is necessary to demount each shell 20 including the half-imprint 21 only to change the mold, for example to manufacture a different container.

Consequently, the molding device 10 also includes reversible connecting means operative between each mold-carrier 14 and the shell-carrier 22 to fix them rigidly together.

To be more precise, the aforementioned fixing means 40 are consequently the means adapted to lock the shell 20 on the shell-carrier 22 since in the present example the half-mold is produced in two separate parts (and not in one piece).

Accordingly, in the case of a molding device 10 including for each mold-carrier 14 and a half-mold of the associated one-piece mold 12, the fixing means 40 are then operative to fix each half-mold directly to the mold-carrier 14.

According to the invention, the fixing means 40 of the device for fixing each half-mold to the mold-carrier 14 are adapted to be driven in movement between at least a fixing position and a release position when the mold-carriers 14 are in the closed position.

The means 40 for fixing each half-mold, here each shell 20, to the mold-carrier 14 are adapted to be actuated selectively to fix or to release each half-mold or shell 20 when the mold-carriers 14 are in the closed position.

The fixing means 40 of the invention are advantageously adapted in particular to allow introduction or removal of a unitary subassembly formed of at least the assembled half-molds by a movement in translation.

Such fixing means of a first embodiment of the invention are described next by way of nonlimiting example.

The means 40 for fixing each half-mold to the mold-carrier 14, i.e. in this example for fixing each shell 20 to the shell-carrier 22, are of mechanical type and result from cooperation of shapes between two elements connected to the respective parts.

Figure 4:
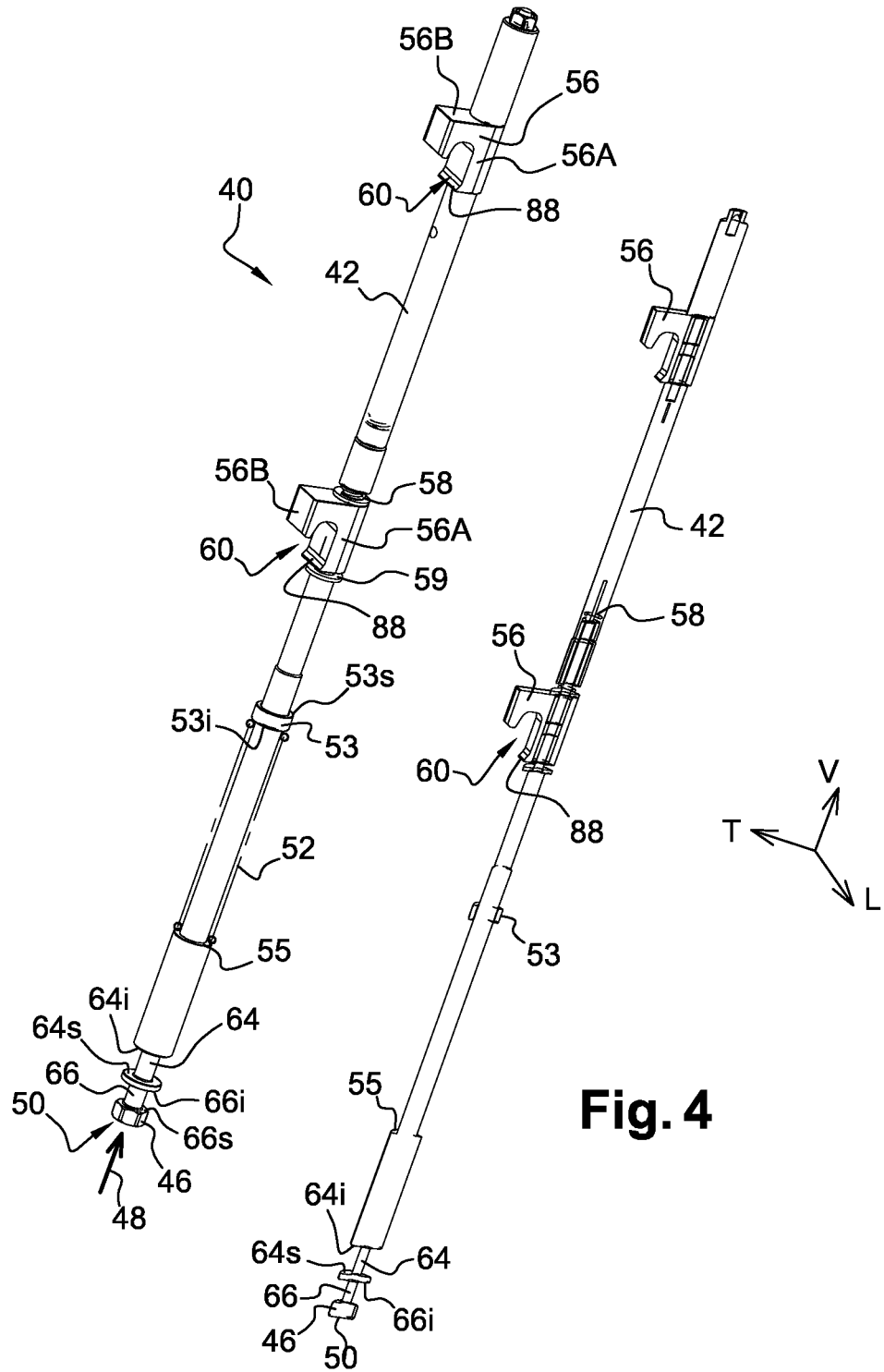
FIG. 4 is a perspective view that shows in detail two actuator members one of which is shown in section on a vertical plane, each member being provided with second fixing elements formed by hooks in this first embodiment.

The fixing means 40 advantageously include at least one actuator member 42 that is shown in detail in FIG. 4, respectively in perspective and in section on a vertical plane.

The actuator member 42 advantageously includes at least one drive part 46 that is adapted to be driven in movement from outside the molding device 10, i.e. without necessarily requiring the mold-carriers 14 to be in the open position to allow access to the fixing means 40.

The fact that the fixing means can be actuated regardless of the open or closed position of the mold-carriers 14 of the molding device 10 eliminates the obligation to open the mold-carriers, as was previously obligatory although somewhat impractical for reaching the fixing means.

The actuator member 42 is preferably carried by the molding device 10, more precisely by the half-mold or here by the shell-carrier 22.

Alternatively, the actuator member 42 could equally be carried by the shell 20. However, the aim is generally to design the molding device 10 in such a manner as to have a mold 12 that is as simple as possible and consequently of lower manufacturing cost.

Figure 5:
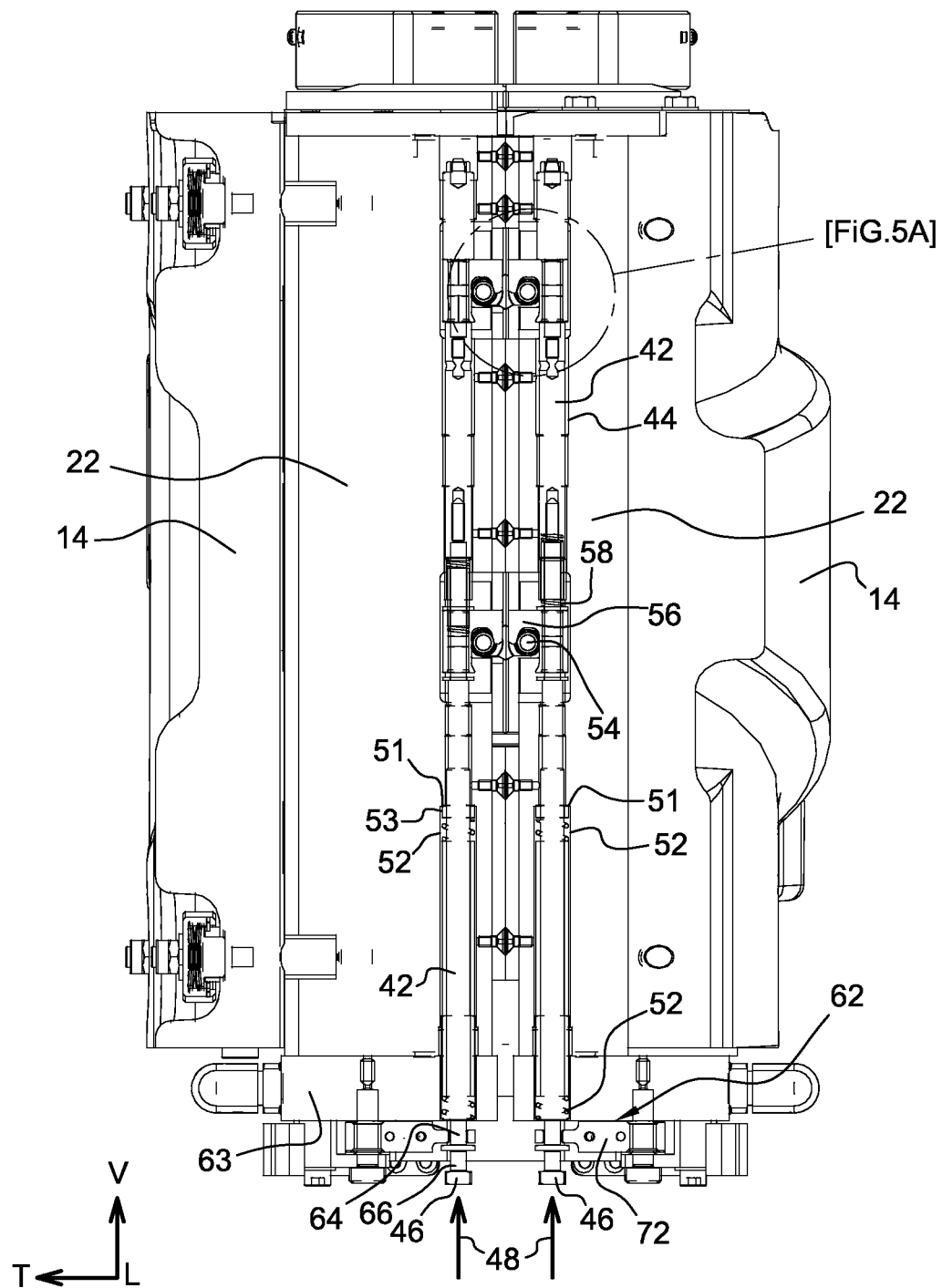
FIGS. 5 and 6 are front views that show a molding device in the closed position and show in vertical section the fixing means of the first embodiment of the invention, each actuator member being mounted in the shell-carrier and shown in fixing and release positions, respectively, notably in the detail views of FIGS. 5A and 6A showing the first and second fixing means.
Figure 6A:
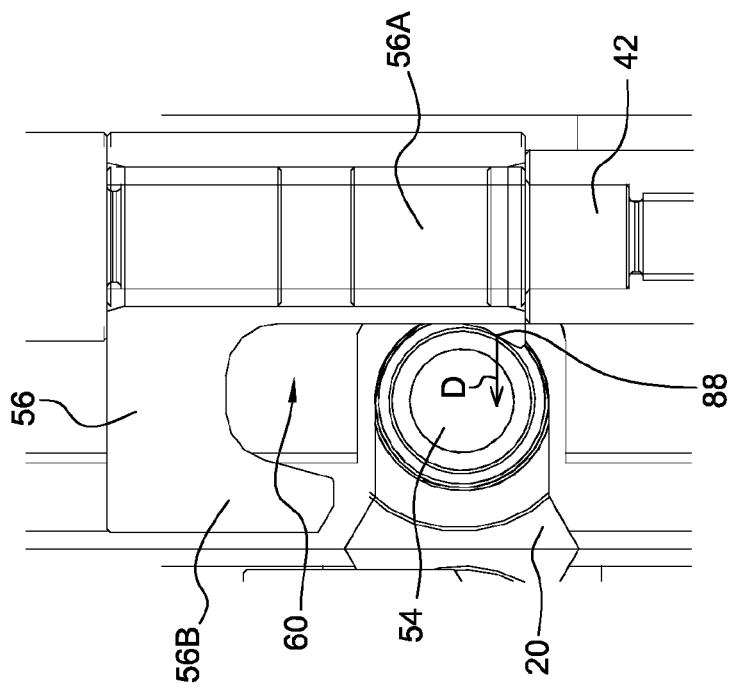
Figure 5A:
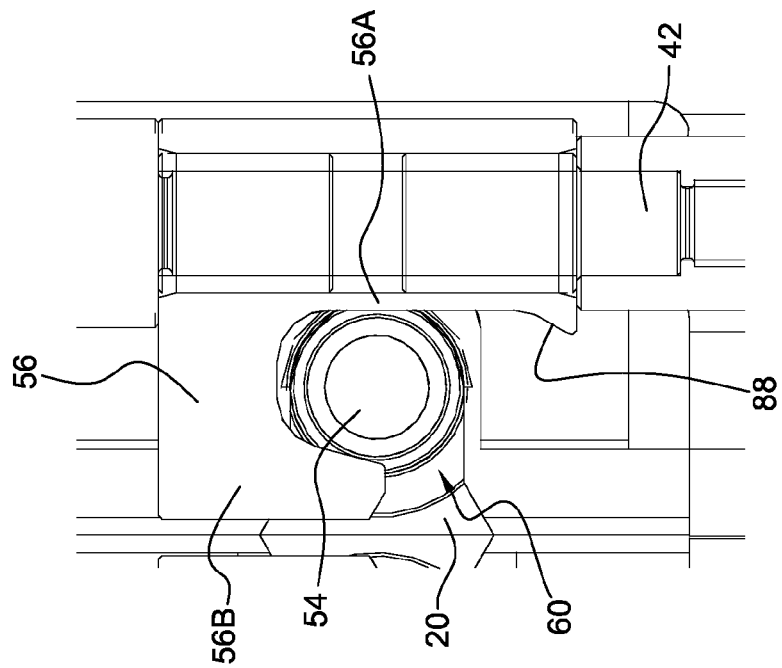
Figure 6:
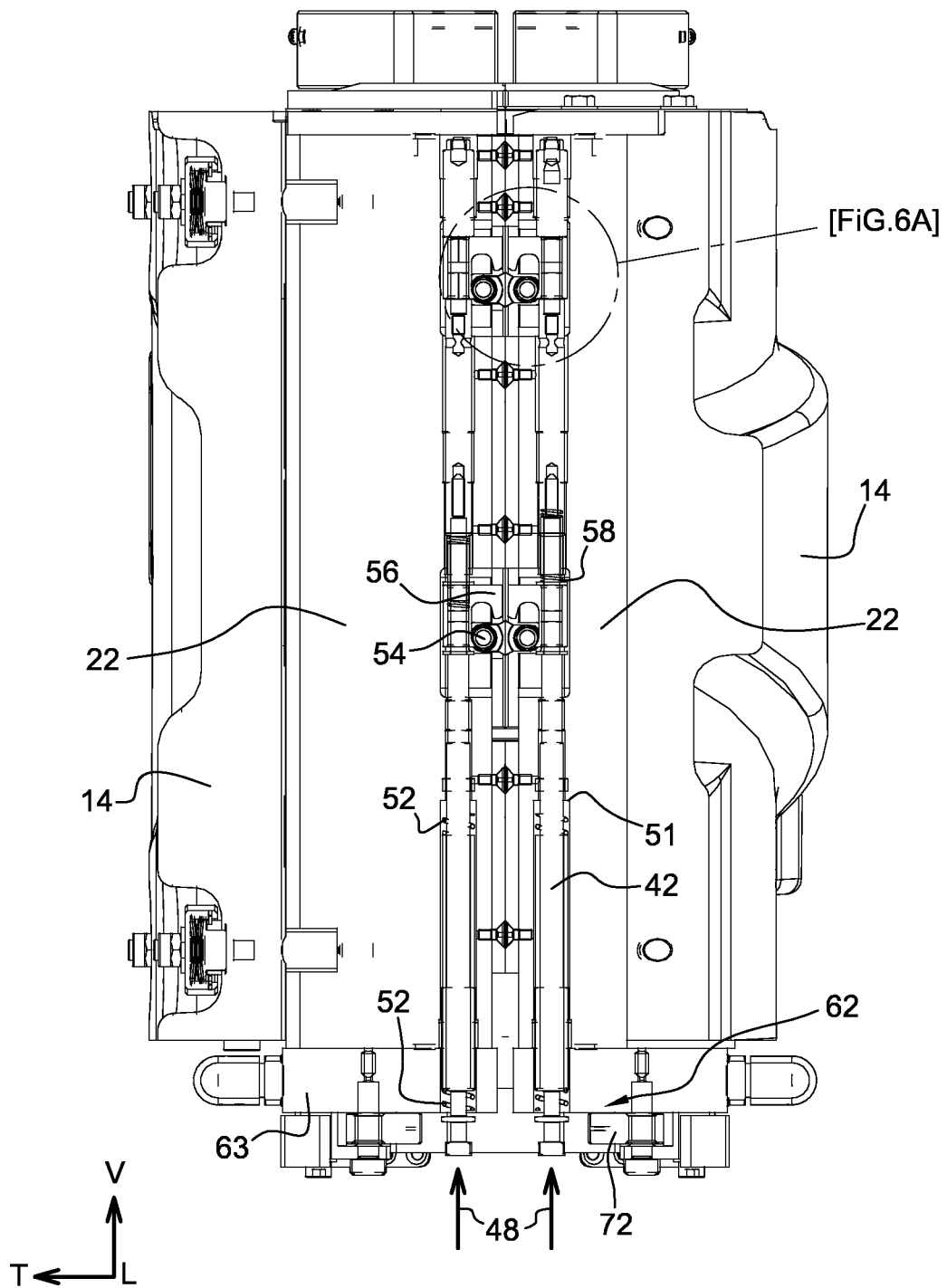

The actuator member 42 carrying the fixing means 40 is mounted to be mobile between at least a fixing position and a release position that are shown in FIGS. 5 and 6, respectively.

The actuator member 42 is carried by the molding device 10, preferably mounted on the shell-carrier 22 in each edge of which at least one complementary recess 44 is provided for this purpose.

The fixing means 40 are advantageously provided on at least one side at the interface of the edges, here the vertical edges, of the shell-carrier 22 and the shell 20, respectively (of the mold-carrier and the half-mold in a two-part embodiment).

The fixing means 40 and in particular the actuator member 42 here are integrated into the molding device 10 in such a manner that the latter is notably compact.

It is important for a rotary blow molding machine that each molding device have a small overall size in order to allow the installation of the greatest number of stations on the circumference of the carousel of the machine and to do so with no risk of interference on opening at least one of the molding devices 10 that are juxtaposed thereon side-by-side.

The actuator member 42 of the fixing means is in particular characterized in that it may be actuated when the mold-carriers 14 are in the closed position.

The drive part 46 of the actuator member 42 preferably projects out of the recess 44 at the lower end of the shell-carrier 22.

The actuator member 42 for the fixing means 40 shown in detail in FIG. 4 has the overall shape of a rod.

The actuator member 42 for the fixing means 40 include a rod a lower section of which constitutes the part 46 for driving movement of the actuator member 42.

Movement of the actuator member 42 for the fixing means 40, here via the drive part 46, is advantageously driven from outside the molding device 10 to cause the release or the fixing of each half-mold to the mold-carrier by the fixing means and to do so regardless of the open or closed position of the mold-carriers 14 of the molding device 10.

When the actuator member 42 is mounted in its recess 44, the drive part 46 preferably projects out of the molding device 10, i.e. lies at least in part outside the recess 44 of the shell-carrier 22, in such a manner as to allow movement of said actuator member 42 to be driven by actuator means of an actuator device that is also external, here below the molding device 10.

In a variant that is not shown, movement of the actuator member 42 is driven from outside the molding device 10 without the drive part 46 projecting.

By way of nonlimiting example of such a variant, the drive part 46 of the member 42 could be inside the recess 44 of the shell-carrier 22 or another rigidly fastened part, in which case the actuator means are designed to penetrate from into the heart of the device the outside in order to act on said drive part 46.

Of course, it is possible for the actuator means also to be integrated into the shell-carrier 22, all this depending on the choice of the drive system including said actuator means.

The actuator member 42 for the fixing means 40 is adapted to be actuated selectively by a drive system 48 including actuator means 106 for causing it to slide between said positions of fixing and releasing the fixing means 40 of each shell 20.

The actuator member 42 preferably slides vertically between said fixing and release positions.

In a variant that is not shown, the actuator member 42 is disposed with a different orientation, for example to slide in the transverse direction, in a horizontal plane orthogonal to the vertical direction.

The actuator member 42 may nevertheless be mounted so as to be mobile between the fixing and release positions according to a kinematic other than sliding.

In a variant that is not shown, the actuator member 42 is mounted so as to be mobile in rotation between the fixing and release positions while acting on the fixing means.

The drive system 48 advantageously includes actuator means 106 that cooperate with a drive face 50 of the drive part 46, at the free end of the lower section, of the actuator member 42.

The fixing means 40 preferably include spring return means 52 that urge the actuator member 42 toward the fixing position so that said member 42 is returned automatically toward said fixing position.

The drive system 48 is diagrammatically represented by an arrow in FIGS. 4, 5 and 6.

The actuator member 42 mounted in the recess 44 of the shell-carrier 22 is able to slide against a spring return member 52 such as a compression spring.

The return spring 52 is mounted around the actuator member 42, which passes through its turns, for example around the lower section of the member 42, and disposed vertically above the drive part 46 situated at the lower end.

As may be seen better in the FIGS. 5 and 6 sections, the upper end of the return spring 52 bears against a lower face 53i of a ring 53 that is adapted to bear via its upper face 53s against a shoulder 51 provided for this purpose in the recess 44 and the lower end of the spring 52 cooperates with an upper face of a shoulder 55 of the actuator member 42.

When the actuator member 42 is moved by means of a drive system 48 from the fixing position shown in FIG. 5 toward the release position shown in FIG. 6, the return spring 52, which is compressed at this time, exerts a vertical downward return force on the shoulder 55 of the actuator member 42.

Alternatively, the actuator member 42 includes no return spring 52 with the result that the sliding of the member 42 between its fixing and release positions then depends on the force applied to the part 46 by the actuator means 106 of the drive system 48.

The fixing means 40 are advantageously integrated into the molding device 10 to produce a compact device.

Such compactness of the molding device is particularly important for a rotary machine in which the number N of stations for a given diameter of the carousel results in part directly therefrom, because the molding devices or stations of the book-like opening type require a minimum space between two consecutive stations to open the mold-carriers by rotation about the axis O.

The fixing means 40 are advantageously at least in part integrated into the interior of the molding device 10 and are disposed between the edge 28 of the shell 20 (or half-mold) and the facing edge of the shell carrier 22 (or mold-carrier), said edges being parallel to the rotation axis O, in such manner as to fix the shell 20 (or half-mold) at one or both of its edges 28.

The fixing means 40 are preferably arranged on either side of the half-imprint 21, on each edge 28 of the shell 20 (or half-mold), i.e. here diametrally opposite in the longitudinal direction, at the level of the vertical molding plane or joint plane.

The respective fixing means 40 include at least one fixing element 54 that is rigidly fastened to each half-mold, here each shell 20, and at least one other fixing element 56 which, complementary to said element 54, is adapted to be moved by the actuator member 42.

In this embodiment, said at least one fixing element fastened to each half-mold is a first fixing element 54 of male type, such as a peg, and said at least one other fixing element 56 connected to the actuator member 42 is a second fixing element of female type, such as a hook.

Said at least one second fixing element 56 is preferably carried by the actuator member 42 so that sliding of the member 42 between the fixing and release positions is simultaneously accompanied by movement of the second fixing element 56.

In a variant that is not shown, the second fixing element 56 is carried by another part, such as the shell-carrier 22 (or the mold-carrier 14) and disposed for example in the recess 44, and the second element 56 is mounted so as to mobile between a first position and a second position, respectively referred to by analogy as release and fixing positions.

In such a variant, the actuator member 42 is advantageously able to cause movement of said second element between said first and second positions when it is itself driven in movement by a drive device 48 to slide between at least two positions corresponding to the fixing or release states of the fixing means 40.

Thus the fixing means 40 (more particularly said second element 56) are adapted to be actuated between the fixing and release positions by the actuator member 42.

The first fixing element 54 is for example a male member while the second element is a female element.

In the embodiment shown in the figures, the first fixing element 54 is a peg while the second fixing element 56 is a hook of complementary shape to said peg 54, with which it is adapted to cooperate.

Alternatively, the first fixing element 54 connected to the half-molds is a female element, for example a detent, while the second fixing element 56 is a male element, for example a lug.

In a variant of this kind, the female element corresponding to the first fixing element 54 is advantageously associated with the shells 20 (or half-molds) in which a "hollow" element, such as a detent, is produced by machining, for example. Thus the shells 20 or half-molds that are frequently manipulated during change of mold operations have no projecting parts that are naturally more exposed to suffer impacts in particular.

If the female element corresponding to the first fixing element 54 is associated with each shell 20 (or a half-mold), it is still preferably possible to provide at least two different types of female element.

Accordingly, at least one edge of the same shell may include two different types of female element in such a manner as to allow mounting and demounting of a mold on a molding device of a given machine equipped with a first type of fixing device or another equipped with a second type of fixing device respectively including different "male" second fixing elements.

Alternatively, one edge of the same shell could also include demountable male or female elements for respectively allowing use with at least two different fixing devices.

Thus an existing shell 20 (or a half-mold) is advantageously adapted to be modified to add to it a first or a second fixing element (for example a peg or a detent) in order to enable polyvalent use in a molding device of a station including a fixing device of the invention.

This is no more than a nonlimiting example, of course, if numerous complementary elements 54, 56 may be used to achieve such cooperation of shapes able to guarantee fixing between each of the respective two parts carrying one of the first and second elements.

As shown in FIG. 2 or 3 for the first embodiment, each shell 20 preferably includes four pegs 54, respectively two upper pegs 54 and two lower pegs 54 that are superposed one above the other on each of the edges 28 of the shell 20, each of which therefore includes a pair of pegs 54.

The pegs 54 are preferably separate elements that are rigidly attached to each edge 28 of the shell 20 which for this purpose includes a recess 61 seen more particularly in FIG. 3 where an upper peg 54 has been omitted on the left-hand shell 20.

Such a shell 20 advantageously has a particularly simple shape that may be produced by molding without additional manufacturing costs and it is also possible to modify the prior art shells 20 easily by making the modifications to them necessary to install the pegs.

Moreover, the pegs 54 may then be produced in a chosen material, different from that used for the shell 20.

Alternatively, the pegs forming the first fixing elements may be integral with, i.e. made in one piece with, the shell 20.

Each shell 20 advantageously includes diametrically opposed first means 54 of the fixing means 40 on its edges.

The fixing means 40 also include two associated actuator members 42 each of which is disposed in a recess 44 provided on each edge of the shell-carrier 22.

Each actuator member 42 includes two hooks 56 forming the second fixing elements and that are respectively associated with each pair of pegs 54 carried by an edge of the shell 20.

Each actuator member 42 therefore preferably includes an upper hook 56 and a lower hook 56 adapted to cooperate with upper and lower pegs 54.

One of the hooks 56 is advantageously connected to said actuator member 42 with play in the vertical sliding direction, i.e. by a connection with play allowing movement of the hook 56 relative to the actuator member 42.

To form said connection with play, the lower hook 56 is preferably connected to the actuator member 42 via a spring member 58 forming play take-up means adapted to guarantee correct positioning in the fixing or release position of each hook 56 with the associated peg 54, notably by compensating tolerances.

Such a connection guarantees correct positioning of the lower hook 56 independently of that of the upper hook 56 fixedly connected to the actuator member 42.

As shown in FIG. 4, the upper end of the spring member 58 bears against the lower face of a shoulder on the actuator member 42 while the lower end loads the upper face of the hook 56 disposed below said spring 58.

The lower hook 56 is therefore not fixed like the upper hook 56 and it is free to be moved vertically relative to the actuator member 42 against the action of the spring 58 and within the limits of a play or range of movement determined by an upper abutment face 59 that is rigidly fastened to the actuator member 42 and with which the lower hook 56 is adapted to cooperate.

Each hook 56 has the overall shape of an inverted "L" including a first vertically oriented branch 56A connected to the actuator member 42 and a second branch 56B orthogonal to the first and here oriented transversely, which with the first branch 56A delimits a generally U-shaped recess 60 in which a complementary peg 54 is adapted to be engaged in the fixing position.

Accordingly, and as described above with reference to FIGS. 5 and 6, the drive part 46 of each member 42 is selectively loaded by the actuator means 106 of a drive system 48 to cause movement of the actuator member 42 between the fixing and release positions.

The fixing position then corresponds to the position of the fixing means 40 in which each hook 56 cooperates with the peg 54 of the shell 20 engaged in the recess 60 in order to press the shell 20 against the shell-carrier 22.

Whereas the release position corresponds to the position in which each hook 56 is retracted in order not to interfere with the peg 54 of the shell 20 occupying said mounted position.

In the mounted position of the shell 20, each peg 54 penetrates via a notch 57 into the recess 44 of the shell-carrier 22 in which is mounted the actuator member 42 carrying the fixing hooks 56.

In the fixing position shown in FIG. 5, each peg 54 is received in the recess 60 of the associated hook 56, which grips it and thus fixes the shell 20 in the shell-carrier 22 at least in the transverse direction.

Apart from the fixing means 40, each shell 20 is retained vertically by the cooperation of shapes between the circular edge 38 connected to the shell-carrier 22 and the groove 32 of the shell 20.

Each hook 56 advantageously assures fixing by exerting on the peg 54 a clamping force corresponding to an attraction force having at least transversely oriented component that is exerted on the peg 54 in the direction from the interior toward the exterior so as to press the external face 26 of the shell 20 intimately against the internal face 36 of the shell-carrier 22.

Thanks to the attraction force resulting from the cooperation between the pegs 54 and the hooks 56 of the fixing means 40, the external face 26 of the shell 20 and the internal face 36 of the shell-carrier 22 are in thermal conduction contact with each other, wholly or in part depending on the application.

Thus satisfactory thermal transfer is advantageously obtained to the shell-carrier 22 provided with cooling means of the circulating fluid type.

In the first embodiment, the molding device 10 advantageously includes a locking system 62 associated with the fixing means 40 which is selectively actuated to lock the actuator member 42 in the fixing position and/or in the release position.

One embodiment of such a locking system 62 shown more particularly in FIGS. 7 to 9 is described next in a manner that is not limiting on the invention.

The locking system 62 is for example mounted on the exterior of a plate 63 disposed in the lower part of the molding device 10 and rigidly fastened to the shell-carrier 22.

The locking system 62 is adjacent the drive part 46, locking preferably being effected on the lower section of the actuator member which, disposed vertically just above said drive part 46, also projects downward out of the shell-carrier 22.

Firstly, as shown in FIG. 4, the actuator member 42 includes a first detent 64 and a second detent 66, or alternatively at least one detent.

The first and second detents 64 and 66 are respectively formed by an annular groove that is produced in the lower section of the actuator member 42, vertically above the drive part 46, the first detent 64 being itself disposed above the second detent 66.

The first detent 64 is delimited vertically by a lower bearing face 64i and by an upper face 64s and the second detent 66 is delimited by a lower bearing face 66i and an upper abutment face 66s.

The locking system 62 includes a support 68 a first part of which is rigidly fixed to the plate 63 by means of a first fixing member 69 such as a screw, and a second part of which is rigidly fixed to the plate 63 by a second fixing member 70.

The locking system 62 includes at least one locking element 72 formed by a latch that is mounted to pivot at one of its ends about the second fixing member 70 and the other end of which is a free locking end and includes a locking notch 74 of complementary shape to the first and second detents 64, 66.

The locking latch 72 is mounted to be mobile between:
an unlocked position shown in FIG. 8 in which the locking latch 72 is retracted to leave the actuator member 42 free to slide between its fixing and release positions, and
a locked position in which the locking latch 72 selectively cooperates with the first detent 64 (FIG. 7) or with the second detent 66 (FIG. 9) of the actuator member 42, said detents 64, 66 respectively corresponding to the fixing position and to the release position of the actuator member 42 for the fixing means 40.

The locking latch 72 includes, between said ends, a lug 76 to which is attached one end of a return spring member 80, here a spring, the other end of which is attached to a stud 78 rigidly fastened to the plate 63 and forming a fixed anchor point.

The locking system 62 includes driving means 82 that are adapted to cause movement of the locking latch 72 from the locked position toward the unlocked position against the action of the spring return member 80.

Thus the spring member 80 loads the locking latch 72 by exerting on the lug 76 of the latch 72 a return force that returns the latch 72 automatically toward the locked position in one or the other of the detents 64, 66.

The driving means 82 of the locking system 62 take the form of an drive arm having an open overall shape or "U" shape.

The drive arm 82 includes a first part 84 that is fixedly attached, for example screwed, to the part of the locking latch 72 opposite the lug 76, and an intermediate part that is extended by a second part 86 forming the free end of the drive arm 82.

Unlocking is obtained by applying an unlocking force to said part 86 to cause the locking latch 72 to pivot from the locking position toward the unlocking position against the action of the return member 80 of the latch 72.

The support 68 advantageously forms an end of travel abutment against which part of the drive arm 82 comes to bear when an unlocking force is applied to the part 86 and that corresponds to a travel sufficient to guarantee unlocking of the latch 72 against the action of the return member 80.

The locking system 62 is preferably an unstable system the only stable state of which corresponds to the locked position, and thus retention of the system in the unlocked position can be obtained only by the permanent application of a sufficient unlocking force F to the part 86 of the drive arm 82.

FIG. 8 shows diagrammatically by means of an arrow F the unlocking force F of this type applied to the part 86 of the drive arm 82.

If the application of such a force ceases or the force applied to the latch 72 via the drive arm 82 is less than the return force exerted by the spring return member 80, said member 80 then automatically returns the locking latch 72 to the locked position.

As may be seen in FIGS. 7 and 9, when the locking latch 72 is in the locked position in the first detent 64, the latch 72 bears against the lower bearing face 64i, and when the locking latch 72 is in the locked position in the second detent 66, the latch 72 bears against the lower bearing face 66i.

A locking system 62 such as that of the embodiment that has just been described with reference to FIGS. 7 to 9 is optional if it does not condition operation of the fixing means 40 of the invention.

Nevertheless, such a locking system 62 has undoubted advantages the main ones of which are described hereinafter.

Firstly the locking system 62 enables fixing of the shell 20 to the shell-carrier 22 to be guaranteed even if the return spring 52 that urges the actuator member 42 toward the fixing position were to fail, for example break.

This is why the actuator member 42 includes the first detent 64 enabling locking of the fixing position.

It will thus be clear that the actuator member 42 could consequently not include a first detent 64 of this kind but only a second detent 66 so that only the release position could then be locked by the locking system 62.

Thanks to the second detent 66 for locking the actuator member 42 in the release position, the locking system 62 then enables temporary and not permanent application of the unlocking force to the drive part 46 by the actuator means 106 of the drive system 48.

Sliding of the actuator member 42 from the fixing position to the release position is effected against the action of the return spring 52.

Accordingly, in the absence of such locking of the actuator member 42 once said release position has been reached, it would be necessary to apply a permanent unlocking force greater than the return force of the spring 52, failing which the latter would immediately cause the actuator member 42 to be returned to the fixing position.

Locking the actuator member 42 in the release position advantageously enables temporary actuation of the actuator means 106 of the drive system 48, with the notable benefit of energy saving.

Thanks to locking of the release position, it is then possible to manipulate each shell 20, for example to change it, independently of the presence or absence of a drive system 48, no unlocking force having to be applied to the drive part 46.

Moreover, a new shell 20 can then be fixed quickly and simply by actuation of the drive arm 82, as shown in FIG. 8, causing the locking system 62 to be unlocked.

By unlocking the locking latch 72 and by virtue of the presence of the spring 52, return of the actuator member 42 toward the fixing position is then automatic.

Note that, once again, the presence of the drive system 48 is not necessary.

The drive system 48 is used in the first embodiment shown in FIGS. 1 to 15 only to command the sliding of the actuator member 42 from the fixing position to the release position and as far as locking the actuator member 42 when the release position is reached.

Moreover, the second detent 66 is "wider", i.e. it has a vertical dimension greater than that of the first detent 64, the dimensions of which here correspond substantially to those of the locking latch 72.

The second detent 66 of the actuator member 42 and the locking latch 72 are advantageously conformed to have some play in the vertical sliding direction to allow the member 42 to move beyond the release position.

Thanks to this, means 88 for unsticking the half-mold, here the shell 20, from the mold-carrier 14 are selectively actuated via the actuator means 106 of the drive system 48.

The unsticking means 88 are advantageously constituted by a ramp part that is carried by each hook 56 and that is disposed on the vertical branch 56A of the hook at the entrance of the recess 60 for the peg 54.

As shown in FIGS. 4 and 6, the unsticking ramp 88 of the hook 56 is adapted to exert an unsticking force on the peg 54 when the actuator means 106 load the actuator member 42 to cause it to slide beyond the release position, by an overtravel determined by said vertical play of the second detent 66 corresponding to the distance between the lower or bearing face 66i and the upper or abutment face 66s.

an arrow D diagrammatically represents the transversely oriented component of the force corresponding to the unsticking force applied to the peg 54 by the ramp 88 of the hook 56.

At least one embodiment of a drive system 48 of the fixing means 40 is described by way of nonlimiting example.

The drive system 48 is of the "mechanical" type, for example, adapted to be actuated manually, i.e. manipulated directly by hand by an operator.

Of course, the actuator means 106 could instead be partly or fully automated, notably using an actuator, such as a piston-and-cylinder actuator or a motor driving a rod.

Moreover, an actuator of this kind may be of the pneumatic, hydraulic or electrical type to supply the actuator means 106 with the energy necessary for the application to the drive part 46 of the actuator member 42 a force to release the fixing means 40 against the action of the spring return member 52 for returning the member 42 toward the fixing position.

Of course, in addition to the drive system 48, it is equally possible to automate the locking system 62, for example also by means of such actuators, for selectively unlocking the locking latch 72.

Unlocking is then advantageously synchronized with the actuator means 106 of the drive system 48 acting on the actuator member 42.

Synchronizing the actuators of the locking system 62 and the drive system 48 then unlocks the system 62 beforehand and during actuation of the member 42 by the actuator means 106 to cause the released member to slide from its fixing position as far as the release position and then to lock the system 62 again when said release position is reached; once the member 42 is locked in the release position, actuation of the drive system 48 may then cease.

By way of nonlimiting example, the mechanical drive system is a toggle clamp.

Such a device is adapted to transform a rotation movement into a translation movement.

The actuator means 106 of the drive system 48 of this embodiment are shown in FIGS. 10 to 15.

In FIG. 10, the drive system 48 is shown in the free state, i.e. here before placing it relative to the molding device 10.

The drive system 48 is advantageously a demountable device that is not permanently mounted on the molding device 10.

To be more precise, the drive system 48 is intended to be mounted on the plate 63 in the lower part of the molding device 10 in the vicinity of the area in which the locking system 62 of the actuator member 42 is already installed.

The drive system 48 includes a chassis 90 that carries the various parts, notably in its upper part means 92 for attaching the drive system 48 to the plate 63 shown separately in FIG. 10 above the drive system 48.

The attachment means 92 include a drive member 94 that is mounted to pivot about a rotation axis A between the ends of said member 94.

The lower or first end of the member 94 is free to enable actuation of the member and to cause it to pivot about the axis A, and the upper or second end includes an oblong opening 96 in which a peg 98 is engaged.

The peg 98 is rigidly fastened to the body of actuator means 100 adapted to drive movement of two attachment fingers 102 that it includes at each of its ends.

The two attachment fingers 102 are mounted to be mobile between a position attaching the drive system 48 to the plate 63 and a retracted position corresponding to the free state of the drive system 48.

Attaching the drive system 48 to the plate 63 is described hereinafter with reference to FIGS. 11 to 13, this step preceding subsequent actuation of the actuator member 42 by the actuator means 106.

The operation of the attachment means 92 is as follows: the drive system 48 is preferably first moved to the oblique position shown in FIG. 11.

The rear part situated on the side of the articulation means 13 of the mold-carriers 14 is engaged first, then the front part, until the particular position shown in FIG. 12 is reached, from which position the attachment of the drive system 48 is then obtained by moving the drive member 94 of the attachment means 92 of the drive system 48.

The drive system 48 then occupies a so-called operating position but it is necessary to attach it to retain it there and to enable the operator to let go.

The lower free end of the drive member 94 is then pushed in the direction of the arrow P, here manually by an operator, to cause the drive member 94 to pivot about its axis A.

The pivoting of the drive member 94 causes movement in parallel of the peg 98 engaged in the opening 96 in the member 94 so that the peg 98 is then moved simultaneously from the high position that it occupies in FIG. 12, which shows the drive system 48 in the position before attaching it, toward a low position that it occupies in FIG. 13, corresponding to attachment of the device in the operating position.

The peg 98 being itself rigidly attached to the actuator means 100, the pivoting of the drive member 94 that causes the movement of the peg 98 in the opening 96 also causes movement in translation of the actuator means 100, which then move each of the attachment fingers 102 in translation from its retracted position to its attachment position.

In the attachment position and as shown more particularly by the FIG. 14 section, each attachment finger 102 penetrates into a complementary hole 104 in a part, here the plate 63, in such a manner as to attach the drive system 48 rigidly to the plate 63.

The actuator means 106 of the drive system 48 then act from outside the molding device 10 on at least one actuator member 42 of the fixing means 40 the drive part 46 of which advantageously projects to be actuated by the actuator means 106.

As shown in FIG. 10, the actuator means 106 preferably include a cam 108 that is mounted to rotate freely via a first part about the pivot A carried by the chassis 90.

The cam 108 has another part, here opposite the rotatably mounted part, rigidly fastened to one end of a control lever 110.

The control lever 110 preferably has at its free other end a handle 112 intended to facilitate its manipulation by an operator.

Alternatively, the free end of the control lever 110 is adapted to be connected to an actuator for selectively actuating the member 42 as described above.

The cam 108 includes a cam surface S adapted to cooperate selectively with the lower drive face 50 of the drive part 46 of the actuator member 42 to cause the actuator member 42 to slide between the fixing and release positions.

To this end, the surface S of the cam 108 includes at least a first cam section T1 and a second cam section T2.

As explained above, each shell 20 preferably includes fixing means 40 of the invention on each of its sides, in the vicinity of its edges 28, so that for each shell 20 it is necessary to drive not one but two actuator members 42.

Alternatively, it is nevertheless possible to provide fixing means on only one of the edges 28 of the shell 20.

In such a variant, the shell 20 is held in place on the other edge 28 adjacent the axis O of the molding device 10 by other means, for example by wedging action between complementary means operative between the shell 20 and the shell-carrier 22, for example a lug of the shell-carrier 22 and a notch of the shell 20.

In such a variant, a shell is then introduced or removed by a circular movement as with the known fixing means of the prior art.

The circular kinematic is accompanied by the successive introduction of the rear edge 28 of the shell 20 and then the other edge 28, at which time the mold-carriers 14 must imperatively be in the open position.

In a preferred use of the first embodiment, each assembly constituted of a shell 20 and its shell-carrier 22 is provided with fixing means 40 of the invention on each of its two edges to enable introduction in accordance with a different and particularly advantageous kinematic.

Thus the fixing means 40 of the invention—when disposed on each edge—on the one hand can be actuated when the mold-carriers 14 occupy the closed position and on the other hand enable introduction or removal of a shell with a movement in translation globally perpendicular to the mold-carrier 14.

Thus the fixing means 40 are advantageously duplicated so that it is necessary to drive the movement of both actuator members 42 adapted to immobilize each of the edges 28 of the shell 20, preferably simultaneously.

This is why the actuator means 106 advantageously include two cams 108 and 108' adapted to drive movement of each of the two actuator members 42 of a shell-carrier 22.

The second cam 108' is mounted so that a first part is mobile in rotation about a pivot B carried by the chassis 90 of the drive system 48 and includes another part that is connected, with the possibility of relative movement, by connecting means 114 to another part of the first cam 108.

Said other part of the first cam 108 here extends beyond the part mounted on the pivot A, inside the chassis 90, opposite the part connected to the lever 110.

The connecting means 114 transmit movement between the cam 108 and the cam 108' in such a manner that any movement of the cam 108 driven by pivoting of the lever 110 is then automatically relayed by the cam 108'.

The cams 108 and 108' are thus driven simultaneously by actuating the single means constituted by the control lever 110.

A molding device 10 includes at least one drive system 48 of the type just described.

The drive system 48 is adapted to be detached from the plate 63 after release of the first shell of the mold 12 in order to proceed to its attachment to the plate 63 of the other shell-carrier 22 and thus release the other shell 20 of the mold 12.

A drive system 48 as shown in FIGS. 10 to 15 is preferably associated with each of the shell-carriers 22 (or mold-carriers 14) to operate the fixing means 40 associated with each shell 20 (or each half-mold) depending on whether the molding device 10 is designed in two or three parts.

The various steps executed to change the mold 12 of a molding device 10 of the type including fixing means 40 of the invention described above and as shown in FIGS. 1 to 15 are described next.

Thus the mold 12 is preferably constituted of two half-molds produced in two parts, namely a shell 20 and a shell-carrier 22 as indicated above.

To be more precise, there are described hereinafter first and second mold changing methods that differ from each other notably according to whether actuation of the member 42 to drive the fixing means 40 is respectively effected when the mold-carriers 14 of the molding device 10 are in the open position in the first case and in the closed position in the second case.

The various steps of the first mold changing method that are executed when the molding device 10 is in the open position are described first.

The various steps relating to the fixing means of the invention are preferably executed manually by at least one operator, but as stated above, some of them may be automated by means of actuators.

Automation of the locking system to unlock the latch and/or to actuate the member 42 may advantageously reduce the time necessary to carry out a change of mold 12.

In this first mold changing method, the operator proceeds manually to change the mold of a molding device 10 by successively removing the parts of the mold, one after the other, by a procedure similar to that used previously with the prior art fixing means.

Of course, to be able to proceed to open the molding device 10, the latch 18 for closing the mold-carriers 14 is actuated beforehand or simultaneously to its unlocked position in order to be able to move the mold-carriers 14 apart, unlocking and opening being effected by the operator.

In this first method, the first step (a) consists in opening the molding device 10, i.e. causing the mold-carriers 14 to pivot about the rotation axis O from the closed position to the open position.

To be able to release a shell 20 from the shell-carrier 22 to change it when said drive system 48 is of the type shown in FIGS. 10 to 15, at least one drive system 48 including the actuator means 106 must have been attached beforehand in the operating position.

This being done, said drive system 48 being in the operating position, each cam 108, 108' is then able to cooperate with the drive face 50 of the drive part 46 of the actuator member 42 when the lever 110 is moved toward its active position.

The drive system 48 of this embodiment being demountable, it is not necessarily attached permanently to the molding device 10, but may be attached only when it is required to intervene on one of the half-molds and to change the mold.

As indicated above, the molding device 10 preferably includes a drive system 48 for each half-mold, here each shell 20, for a molding device 10.

Said drive systems 48 are attached in the operating position at the latest after opening, on the assumption that they are detached at the end of the mounting/demounting operations and do not permanently remain rigidly fastened to the plates 63.

In this latter case, it is clear that a pair of drive systems is sufficient to proceed successively to multiple changes of shells (or of half-molds depending on the design of the mold) when the various molding devices 10 of a "rotary" machine successively cross a particular area for the mold changing method to be carried out station by station.

A second step (b) thus consists in attaching the drive system 48.

Of course, this kind of second step (b) is executed only if the drive system 48 is of the type shown in FIGS. 10 to 15, which it must be remembered is merely one possible embodiment, or a similar drive system 48 that is demountable and that has been demounted or that is to be demounted.

Accordingly, in the case of a drive system 48 permanently mounted on the plate 63, such a second step (b) would be to no purpose.

Alternatively, the drive system 48 (whether demountable or not) is not demounted but remains rigidly fastened to the plate 63; one such drive system 48 is for example a toggle clamp of the type shown in FIGS. 19 and 20.

In this case, each shell-carrier or mold-carrier is equipped with the drive system 48, including during manufacture of containers in which it is not used.

Another alternative is for the drive system 48 to be rigidly fastened to the frame of the machine including the molding device 10.

The drive system 48 is then preferably disposed in a particular area in such a manner as to drive the machine in rotation and to pass the molding devices 10 in succession through said area including the drive system 48.

It is advantageous if the drive system 48 is retractable or if the actuator means of the device are retractable in order not to interfere with the mold-carriers when the machine is manufacturing containers production mode and not operating in the mold changing service mode.

In the first embodiment, the fixing means 40 include a return spring 52 that permanently urges the actuator member 42 toward the fixing position, in which the pegs 54 are engaged in the recesses 60 of the hooks 56 and the shell 20 fixed to the associated shell-carrier 22.

If the molding device 10 is provided with an associated locking system 62, then the locking system 62 must be unlocked beforehand in a third step (c).

In this third step, the system 62 disengages the locking latch 72 from the first detent 64 of the actuator member 42 in order for the actuator member 42 to be able to slide from its fixing position toward its release position.

It will remembered that the molding device 10 advantageously includes, for each shell 20 (or half-mold), a double fixing, i.e. fixing means 40 disposed at each of the edges 28 of the shell 20 and of the adjacent edges of the associated shell-carrier 22 (or mold-carrier).

For the third step, the operator first exerts a force manually in the direction from the exterior toward the interior on the part 86 of each of the drive arms 82 until it abuts against the support 68.

In doing this, the operator causes the required unlocking in each locking system 62 associated with the actuator member 42, i.e. pivoting of the locking latch 72 about its axis to the unlocked position and that against the action of the spring return member 80 of the latch 72 toward the locked position.

Each latch 72 driven by the part 84 of the drive arm to which it is rigidly fastened pivots toward the unlocked position in which the notch 74 of the latch 72 is free, neither of the detents 64 or 66 being any longer engaged therein.

Note that the parts 86 of each of the drive arms 82 of each locking system associated with the actuator members 42 are adjacent and sufficiently close to each other for the operator to be able to load them simultaneously with one hand in order to unlock each locking latch 72.

As explained above, the locking system 62 of the embodiment of FIGS. 7 to 9 is not a bistable system, i.e. the unlocked position is not a stable position, with the result that the operator must, with one hand, maintain his force on the drive arm 82 at least until actuation of the lever 110 of the drive system 48 (failing which the latches 72 will automatically be returned to the locked position by the springs 80).

Once the locking system 62 has been unlocked after said third step (c), the actuator member 42 is free to be actuated by the drive system 48 in order to cause it to slide, against the action of the spring 52, from the fixing position toward the release position.

Of course, the third step (c) is executed only if the molding device 10 includes such a locking system 62 which, although it may be dispensed with, has various advantages described above.

In a fourth step (d), the fixing means 40 are driven from the fixing position toward the release position.

With fixing means 40 of the first embodiment, this means driving the sliding movement of the actuator members 42 of each shell 20.

To do this, the operator uses his other hand to actuate the lever 110 to raise it in order to cause it to pivot from its rest position toward its active position.

As the lever 110 moves toward the active position, the drive part 46 of each of the two actuator members 42 associated with the shell 20 is loaded by the corresponding cam 108, 108' with a release force exerted against the action of the spring 52 that causes each member 42 to slide toward the release position.

Here the cam 108' simultaneously loads the drive part 46 of the other actuator member 42 at the rear.

To be more precise, the drive face 50 of the drive part 46 cooperates with the surface S of the cam 108 the sections T1 and then T2 of which are successively traveled and conformed to cause the actuator member 42 to slide toward the release position.

When the release position is reached, the actuator member 42 is locked in the release position in a fifth step (e).

To do this, the operator ceases to apply force to the drive arms 82 while keeping the lever 110 in the active position to overcome the force exerted by the return spring 52.

The effect of ceasing to apply force to the drive arms 82 is that each locking latch 72 of each system 62 is automatically returned toward its locked position and, by virtue of the drive member 42 sliding toward the release position, is engaged in the second detent 66 facing it.

The locking latch 72 bearing against the lower bearing face 66i, the actuator member 42 that is in the release position is then locked by the locking latch 72 (locked position).

Of course, this kind of fifth step (e) is executed only in the presence of a locking system 62.

The fifth step (e) is advantageously facilitated by the automatic return of the latch 72 toward the locked position thanks to which locking is achieved by simply releasing the drive arm 82 and without any additional force being necessary.

In a sixth step (f), the operator either ceases to hold the lever 110 in the active position and releases it when the actuator member 42 is locked in the release position by a locking system 62 or continues to apply force to the lever 10 at least until the shell 20 is demounted.

Of course, depending on the type of drive system 48 used, it is possible for the actuator means 106 to be held in the active position without requiring the constant application of a force to the lever 110, in particular if the active position of the drive system 48 is a stable position.

If the operator has not already done so when moving the lever toward its active position, he advantageously applies an additional load to the lever 110 in order to cause the actuator member 42 to execute the overtravel for actuating the unsticking means that the ramp 88 of each hook 56 constitutes.

Thanks to this, the shell 20 is unstuck from the shell-carrier 22.

Thus in a seventh step (g), the means for unsticking the shell 20 from the shell-carrier 22 are actuated.

The various steps relating to demounting in accordance with the first mold changing method are advantageously carried out by two operators, one of whom grasps the shell 20 and removes it from the shell-carrier 22 of the molding device 10 while the other performs the other operations, in particular the unlocking operation with one hand and the actuation operation to release the shell with the other.

After successively completing the various steps to remove the first shell 20, the operator repeats the same operations to remove the second shell 20, either before or after fixing a new shell in place of the first shell.

The steps of the first method may also be carried out by a single operator, in particular in the absence of a locking system to be actuated or of spring return of the system 62 to the locked position.

The actuator member 42 is advantageously then held in the release position directly by the drive system 48, with or without a return spring 52 for the actuator member 42.

Of course, apart from demounting each of the shells 20, the operator also demounts the mold bottom 34 in a further step.

Thus the mold bottom 34 is separated from its support saddle after disconnecting the fluid connections.

The step of demounting the mold bottom 34 is preferably carried out immediately after the first step (a) of opening the mold-carriers 14 and before the subsequent steps so as to free the space inside the molding device 10 and facilitate access to the shells 20 for the operator.

Advantageously only the shells 20 each provided with the half-imprint 21 are demounted which, compared to the shell-carriers 22, are lighter and have no fluid connections.

Each shell-carrier 22 on the other hand remains mounted on and fixed to the mold-carrier 14 of the molding device 10.

The steps carried out to mount a new shell 20 in each shell-carrier 22 are generally the same as those described above but in the reverse order.

Following the aforementioned demounting steps, the fixing means 40 are in the release position and are retained in that position by the locking system 62 the locking latch 72 of which is engaged in the locked position in the second detent 66 of each actuator member 42.

For mounting, in an eighth step (h) a shell 20 is introduced and positioned.

To be more precise, by a movement in translation globally perpendicular to one of the shell-carriers 22, the operator introduces a first shell 20 until said shell 20 occupies the mounted position in which it may be fixed to the shell-carrier 22.

The mounted position is reached when the pegs 54 penetrate the notches 57 in the recess 44 of the actuator member 42 and are correctly positioned relative to the hooks 56.

In a ninth step (i), the fixing means are driven from the release position to the fixing position.

In the present example, to drive the fixing means 40 and to fix the shell 20 to the shell-carrier 22, the operator actuates the drive arms 82 in order to cause unlocking of the locking systems 62 the latch 72 of which immobilizes the associated actuator member 42 in the release position.

To do this, the operator exerts a force on the part 86 of each drive 82 to overcome the return force exerted by the spring 80 and to cause the locking latch 72 to pivot toward its unlocked position.

The latch 72 no longer being engaged in the second detent 66, each actuator member 42 is then free to slide from the release position that it was previously occupying to the fixing position.

To be more precise, the actuator member 42 slides automatically thanks to the spring return member 52 that urges the member 42 toward said fixing position at all times.

In the fixing position, the hooks 56 are engaged around the pegs 54 so that the shell 20 is fixed by each of its edges 28 to the shell-carrier 22 and the external face 26 of the shell 20 is pressed by an appropriate attraction force against the internal face 36 of the shell-carrier 22.

As soon as the fixing means 40 occupy the fixing position, the operator advantageously ceases to apply a force to the driving arm 82 intended to maintain the locking system 62 in the unlocked position.

Thus the locking latch 72 is returned automatically toward its locked position by the spring 80 in such a manner that its notch 74 is positioned in the first detent 64, thereby locking the actuator member 42 in the fixing position.

Accordingly, even if the spring 52 should break, the actuator member 42 would be retained in the fixing position and correct operation of the molding device 10 guaranteed.

In the presence of a return spring 52, the drive system 48 including the actuator means 106 advantageously intervenes only during operations to demount a shell 20 and not during mounting and fixing a shell 20 in the shell-carrier 22, which enables the necessary intervention time to be further reduced.

The fixing means 40 of the invention advantageously enable further reduction of the intervention time by at least one operator to demount and mount the shells 20 successively.

It is clear from the description that has just been given that the fixing means 40 are driven in a particularly simple and fast manner either by acting simultaneously on two drive arms 82 or by actuating the lever 110.

Consequently, the fixing means 40 of the invention enable further reduction of the total time necessary to change a mold on a molding device 10.

However, if the procedure followed is that just described, the molding device 10 is in the open position and the shells 20 are mounted or demounted successively one after the other to enable an operator to remove or introduce each of them from or into the shell-carrier 22.

A second mold changing method is described next in which actuation of the fixing means by the drive system occurs when the mold-carriers 14 of the molding device 10 are in the closed position, thanks to which the time to change a mold is further and significantly reduced.

The mold 12 is therefore preferably constituted of two half-molds produced in two parts, namely a shell 20 and a shell-carrier 22 as indicated above.

According to a particularly advantageous feature of the invention, the fixing means 40 are also adapted to be driven when the mold-carriers 14 are in the closed position.

Thus the fixing means 40 of the invention may be driven when the mold-carriers 14 are in the open position and when the mold-carriers 14 are in the closed position.

Movement of the drive part 46 of the actuator member 42 is adapted to be driven from outside the molding device 10 regardless of the open or closed position of the mold-carriers 14 of the molding device 10.

In a manner that is not limiting on the invention, the drive part 46 of each actuator member preferably projects from the molding device 10 so that it is possible to act on the drive part 46 independently of the open or closed position and very particularly by comparison with the known prior art solutions including in the closed position.

Although the various steps relating to the fixing means of the invention may be performed manually by at least one operator, the steps are thus preferably automated by means of appropriate actuators and intervention by the operator at least limited or even eliminated.

In particular, automating the driving of the locking system to unlock the latch and/or to actuate the member 42 advantageously enables further reduction of the time necessary to change a mold 12.

In this method of changing the mold 12, the steps described hereinafter are carried out when the mold-carriers 14 of the molding device 10 are in the closed position.

The molding device 10 is preferably moved beforehand into a particular area of the manufacturing machine to change a mold.

In a rotary machine, such an area is for example situated on the opposite side of the machine to that in which the preforms are introduced and the finished containers removed.

In the mold changing method of the invention, there is first carried out a step (a) consisting in driving the fixing means 40 to release each half-mold when the mold-carriers 14 occupy the closed position.

With the fixing means 40 of the first embodiment, the step (a) notably includes the sub-steps described hereinafter.

In a first substep (a1) unlocking of the locking systems 62 is commanded in order to release each of the actuator members 42 of the fixing means 40.

The first substep (a1) is executed for each of the shells 20, advantageously simultaneously.

For each shell 20, first actuator means (not shown) such as a controlled actuator are used that are adapted to actuate at least one locking system 62.

Each actuator is advantageously adapted to actuate both locking systems of a shell 20 simultaneously.

Alternatively, the locking system 62 is actuated manually by an operator who exerts the unlocking force and carries out in succession the sub-steps for one shell 20 and then for the other shell 20.

Thus the actuator is actuated so that, in each of the systems 62, the locking latch 72 is disengaged from the first detent 64 of the actuator member 42 so that the actuator member 42 may be caused to slide from its fixing position toward its release position.

As shown in FIG. 8, the controlled actuator is adapted to exert an unlocking force F transversely from the exterior toward the interior on the part 86 of each of the drive arms 82 over a travel determined by each locking system 62 coming into abutment against the support 68.

This being so, the actuator effects the required unlocking in each locking system 62 associated with the actuator member 42, i.e. pivoting of the locking latch 72 about its axis to the unlocked position against the action of the member 80 returning the latch 72 elastically toward the locked position.

Each latch 72, driven by the part 84 of the drive arm to which it is rigidly fastened, pivots toward the unlocked position in which the notch 74 of the latch 72 is released, neither of the detents 64 or 66 being any longer engaged therein.

It will be noted that the parts 86 of each of the drive arms 82 of each locking system associated with respective actuator members 42 are adjacent and sufficiently near each other for the actuator to be able to load them simultaneously in order to bring about the unlocking of each locking latch 72 of the two systems 62 that a shell 20 includes.

As explained above, the locking system 62 of the embodiment of FIGS. 7 to 9 is not a bistable system, i.e. the unlocked position is not a stable position, with the result that the operator must, with one hand, maintain their force on the drive arms 82 at least until the member 42 is actuated by the drive system 48 (failing which the latches 72 will be returned automatically to the locked position by the springs 80).

Once the locking system 62 has been unlocked in the substep (a1), the actuator member 42 is then free to be actuated by the drive system 48 in order to cause it to slide against the action of the spring 52 from the fixing position toward the release position.

Of course, the substep (a1) is executed only if the molding device 10 includes such a locking system 62 which, although it may be dispensed with, has various advantages described above.

In a second substep (a2), each actuator member 42 being unlocked, the drive system 48 is actuated to cause the fixing means 40 to slide from the fixing position to the release position.

As shown in FIG. 6, execution of the second substep (a2) depends of course on the drive system 48 used.

The drive system 48 is advantageously also an actuator adapted to load selectively the drive part 46 of each of the two actuator members 42 associated with the shell 20 in order to exert against the action of the spring 52 of each of them a release force that causes each member 42 to slide toward the release position.

Alternatively, the drive system 48 is a mechanical device, such as that shown FIGS. 10 to 15 or FIGS. 19 and 20, which is adapted to be actuated manually by an operator, for example via a lever.

When the release position is reached (FIG. 6), the actuator member 42 is locked in the release position in a third substep (a3).

Of course, this kind of substep (a3) is executed only in the presence of a locking system 62.

The drive system 48 is able to maintain each actuator member 42 in the release position at least until the locking substep (a3).

To effect locking, the actuator ceases to exert its force on the drive arms 82.

The effect of ceasing to apply forces to the drive arms 82 is that each locking latch 72 of each system 62 is automatically returned toward its locked position and, because the drive member 42 slides towards the release position, is engaged in the second detent 66 facing it, as shown in FIG. 9.

The locking latch 72 bearing against the lower bearing face 66i, the actuator member 42 in the release position is then locked by the locking latch 72 (locked position).

Automatic return of the latch 72 toward the locked position has the advantage of facilitating this maneuver because locking is obtained simply by releasing the drive arm 82 and without any additional force being necessary.

In a fourth substep (a4) the means for unsticking the shell 20 from the shell-carrier 22 are actuated.

The fourth substep (a4) is advantageously carried out simultaneously with the execution of the substep (a2) by the actuator to load each actuator member 42 with a release force adapted to cause each of them to perform the overtravel beyond the release position in order simultaneously to bring about unsticking.

After the step (a), the shell 20 present inside the molding device 10 are no longer fixed to the shell-carriers 22, nor the mold bottoms 34 to the saddle, where applicable, with the result that the joined shells 20 grip between them the mold bottom 34 advantageously constituting a unitary subassembly.

However, the shells 20 are then held together only by the mold-carriers 14 that in the closed position surround said unitary subassembly.

This is why the mold 12 advantageously includes at least one part 120 that projects out of the molding device 10.

The shells 20 of the mold 12 advantageously have a projecting top part 120 extending vertically above the groove 32 in which the edge 38 of the shell-carrier 22 is received.

By way of nonlimiting example, the mold 12 shown in FIGS. 2 and 3 advantageously has such a projecting top part 120 adapted to enable holding and immobilization of the parts of the unitary subassembly.

The projecting top part 120 of the shells 20 is intended to allow fitting of assembly means, optionally able to provide a support function, to join the half-molds together and form said transportable unitary subassembly that is constituted by the shells 20 trapping the mold bottom 34.

Thanks to this top part, it is notably possible to join the shells 20 together from outside the molding device 10 when the mold-carriers 14 are in the closed position.

Accordingly, the second step (b) of the method of the invention consists in assembly means joining the half-molds together in such a manner as to form a transportable unitary subassembly when the mold-carriers occupy the closed position.

Each shell 20 being free of the shell-carrier 22 since execution of the step (a), there is a risk of the latter falling out when the mold-carriers 14 are opened.

In a particularly simple and economic embodiment, the assembly means are constituted by a link that is placed by the operator at the level of the top part 120 of the mold 12 that projects out of the mold-carrier 14 in such a manner as to immobilize the shells 20 in said joined position and constitute the unitary subassembly.

The assembly means are adapted to hold the half-molds together in order to constitute said transportable unitary subassembly forming a compact block that may be moved.

When the mold 12 includes a mold bottom 34, the latter is held automatically in place by cooperation of shapes with the shells 20 which, surrounding it, grip it circumferentially.

Numerous devices for holding and/or supporting the unitary subassembly may be envisaged, notably mechanical devices.

Alternatively, the mold 12 includes a temporary locking device adapted to hold the shells together to constitute the unitary subassembly. The locking device advantageously includes locking means that are mounted to be mobile between a retracted position and a locking position.

Moreover, the locking means are advantageously driven between said positions by a drive element, for example an element connected to the actuator member 42 of the fixing means 40 in such a manner as to exploit the sliding of said member 42 toward its release position to proceed immediately afterward to the immobilization of the shells 20.

The shells 20 are for example locked using the pegs 54 present on each of the shells 20.

In another variant holding means such as a clamp are placed around the top part 120 and provide both the function of assembling the shells together to form said unitary subassembly and the function of supporting such a unitary subassembly, said holding means being actuated by the operator or automated and connected to a support structure.

The step (b) is advantageously executable either before or after the step (a).

Whatever assembly means are chosen, they preferably also provide the support function in such a manner as to facilitate transporting the unitary subassembly.

The third step (c) consists in opening the mold-carriers from the closed position to the open position to remove said unitary subassembly therefrom by a movement in translation in such a manner that said unitary subassembly remains in a reference position when the mold-carriers 14 are opened.

On opening the mold-carriers from the closed position to the open position, the unitary subassembly previously constituted is preferably removed "automatically" and remains stationary, only the mold-carriers 14 moving transversely away from each other.

When assembly only means (i.e. with no support function) are placed in the step (b), the unitary subassembly is supported by its bottom 34 in the reference position, notably by means of a saddle.

The assembly means are advantageously constituted by the holding means (not shown) referred to above, namely a clamp the jaws of which are adapted to grip the top part 120 of the unitary subassembly, which clamp then also provides the function of supporting the transportable unitary subassembly.

Thanks to the cooperation of the holding means associated with the top part 120, it is then possible to open the mold-carriers 14 of the molding device 10 without risk of the unitary subassembly falling out.

The fourth step (d) consists in removing the unitary subassembly from its reference position between the mold-carriers.

The mold bottom 34 is preferably unlocked from the support saddle and the fluid connections unplugged before removing the unitary subassembly.

As indicated above, the unitary subassembly is advantageously entirely supported by the holding means from which the subassembly is suspended.

Of course, the holding means could equally be the hands of an operator holding the unitary subassembly produced by the assembly means to remove it from the reference position, which here is a central position.

Alternatively, removal of the unitary subassembly is automated and effected by means of a robot including at least one drive arm provided with holding means.

This completes the phase of the method of demounting the mold 12 with the molding device in the open position awaiting the mounting of another unitary subassembly.

A phase of mounting a unitary subassembly then follows on from the aforementioned demounting phase. The following steps are executed for this purpose.

In the mounting phase, a fifth step (e) consists in placing a unitary subassembly in said reference position between the mold-carriers in the open position.

The mold-carriers 14 being in the open position, a unitary subassembly is introduced in the direction of the arrow into the reference position.

In this embodiment of the molding device 10, the bottom 34 is preferably mounted on the saddle and the required fluid connections, if any, are plugged in.

The unitary subassembly is then supported by the saddle and the shells 20 held by the assembly or holding means.

The mold-carriers are then closed onto the unitary subassembly in a sixth step (f).

As soon as the mold-carriers 14 close onto the unitary subassembly previously placed in the reference position, it is possible to remove the assembly means.

The seventh step (g) consists in removing the assembly means from the unitary subassembly to allow separation of the half-molds.

The eighth step (h) consists in actuating the fixing means to fix each half-mold to the associated mold-carrier.

With fixing means 40 conforming to the first embodiment, fixing is obtained by executing substeps similar to those described above for step (a) of the demounting phase.

The locking system 62 is unlocked in a substep (h1).

The fixing of the shells 20 in the shell-carriers 22 is advantageously obtained automatically because the actuator members 42 are returned toward the fixing position and so no specific fixing substep is required.

In the absence of an actuator member 42 return spring, in a substep (h2) the drive system 48 is actuated to move the actuator member from the release position toward the fixing position, for example by means of the actuator forming the drive system 48.

Once the fixing position has been reached (FIG. 5), the locking system 62 is actuated to lock said actuator member 42 for the fixing means 40 in the fixing position.

As the locking system 62 includes a spring for returning the latch 72 to the locking position from the position of fixing the actuator members 42 of the fixing means 40, no particular substep is required and locking is obtained automatically.

Alternatively, in the absence of any such means for returning the latch 72 toward the locked position, the locking system 62 is actuated in a substep (h3) to lock the actuator member by means of the latch 72.

If necessary, the lock 18 is then advantageously actuated to lock the mold-carriers 14 in the closed position.

The mold changing method of the invention has the advantage of enabling a great reduction in the time necessary for demounting and mounting compared to known solutions of the prior art.

The unitary subassembly formed by the shells 20 and where applicable the mold bottom 34 may be mounted and demounted in a single operation rather than successive operations of grasping and then putting down each of the parts.

Such a mold changing method is made possible by the fixing means of the invention that enable release and fixing of the unitary subassembly in a particularly simple and fast manner.

In a particularly advantageous operating procedure, intervention of the operator is reduced or even eliminated and the support means, such as a clamp actuated to open and close it and advantageously also providing the function of holding the unitary subassembly, are connected to a transport device.

Such a transport device is advantageously adapted to transport the unitary subassembly after the demounting phase to a store while other support means are advantageously waiting with a new unitary subassembly to mount it immediately on the molding device 10 by the steps corresponding to the mounting phase.

Of course, in the method just described, to be able to open and close the molding device 10, the lock 18 for the closed mold-carriers 14 is actuated beforehand or simultaneously to move toward its unlocked or locked position in order to be able to move the mold-carriers 14 away from each other, this unlocking and opening being effected manually by the operator.

To this end, after manually exerting a force on the cam driving the lock 18, the operator exerts a transverse force, again manually, to move the mold-carriers 14 apart and to open them until they reach said open position.

The lock 18 preferably includes return means adapted to return the lock automatically to its position for locking the mold-carriers in the closed position.

The second mold changing method thus advantageously enables further reduction of the time necessary for demounting compared to the first method, even more so compared to the solutions known in the prior art.

In the second method, the unitary subassembly formed of the shells 20 and where applicable the mold bottom 34 may be mounted or demounted in a single operation and no longer by successive operations for each shell 20.

Such a mold changing method is made possible by the fixing means of the invention thanks to which the unitary subassembly is released in a particularly simple and fast manner.

In a particularly advantageous operating procedure, intervention of the operator is reduced or even eliminated and the means for holding the unitary subassembly, such as a clamp actuated to open and close it, are connected to a transport device adapted to transport such a unitary subassembly after the demounting phase to a store while other holding means are advantageously waiting with the new molding unitary subassembly to mount it immediately on the molding device 10 by the steps corresponding to the mounting phase.

A second embodiment of fixing means for a molding device of the invention shown in FIGS. 16 to 20 is described next.

The description of the second embodiment of the fixing means has the advantage of being compared to the first embodiment.

Moreover, elements with the exception of the first fixing means having similar, analogous or identical functions are designated by the same reference numbers increased by two hundred; for example, the reference 220 corresponds to the reference 20 and designates the shells.

FIG. 16 shows only one half-mold of a mold 212. Each half-mold is preferably produced as before in two separate parts, namely a shell 220 including a half-imprint (not shown) that is adapted to be fixed demountably to a shell-carrier 222 by fixing means 40.

The other half-mold (not shown) is in every way identical to that shown in FIG. 16 and each half-mold is adapted to be mounted on a mold-carrier 14 of a molding device 10 for a container manufacturing machine such as the molding device 10 shown in FIGS. 1 and 2.

The fixing means 40 are intended to equip a molding device 10 of the type described above and including:
 two mold-carriers 14 mounted to be mobile relative to each other between an open position and a closed position,
 two half-molds 220 each provided with a half-imprint and carried by a mold-carrier 14 mounted in the respective associated mold-carrier 14, and
 fixing means 40 adapted to fix each half-mold 220 occupying a mounted position demountably to the mold-carrier 14.

To be more precise, the fixing means 40 include first fixing means 140 and second fixing means 240.

The first fixing means 140 are disposed between the rear edges of the shell 220 and the shell-carrier 222, i.e. the edges on the same side as the rotation axis O of the mold-carriers 14, while the second fixing means 240 are disposed between the front edges of the shell 220 and the shell-carrier 222, diametrically opposite the first fixing means 140.

The first fixing means 140 are analogous to those described for the side adjacent the rotation axis in the prior art document EP-B1-0 821 641 referred to above, which should be referred to for more details.

According to the above document, the fixing members disposed on this rear side do not have to be actuated and preferably constitute simple adjustable stops.

The mutual positioning in the vertical direction of the shell-carrier 222 and the shell 220 is advantageously obtained by cooperation of shapes of a set of elements of the rib/groove type nested one within the other and part of which is visible on the external face 226 of the shell 220 in FIG. 1.

As shown in FIGS. 17 and 18, the first fixing means 140 preferably include primarily a vertical bar 141 that has transversely protruding parts 143 adapted to be received in recesses 145 of complementary shape in the rear edge 138 of the shell 220.

The bar 141 preferably includes recesses 147 for fixing members (not shown) for fixing the bar 141 to the shell-carrier 222 to pass through.

With first fixing means 140 of this kind, the shell 220 is introduced into the shell-carrier 222 by sliding and rotating it.

The second fixing means 240 illustrating the second embodiment of the fixing means 40 of the invention are more particularly described next.

According to the invention, the second fixing means 240 for fixing each shell 220 to the shell-carrier 222 are mounted to be mobile between at least a fixing position and a release position of the shell 220 and are adapted to be actuated to move between said positions when the mold-carriers 14 are in the closed position.

The second fixing means 240 include at least one actuator member 242 adapted to be driven in movement from outside the molding device 10 regardless of the open or closed position of the mold-carriers 14 of the molding device 10.

The actuator member 242 is preferably constituted by a vertical threaded rod.

The actuator member 242 of the second fixing means 240 is advantageously adapted to be driven selectively by a drive system 248 adapted to drive selectively vertical sliding of said member 242 between the fixing and release positions of each shell 220.

The second fixing means 240 advantageously include at least one first fixing element 254 which is connected to each shell 220 and at least one second fixing element 256 which, complementary to the first element 254, is connected to the actuator member 242.

The first elements 254 are preferably constituted by studs rigidly fastened to the external face 226 of the shell 220, each projecting stud 254 including an plane internal bearing face 254i extending vertically in the longitudinal direction.

The studs 254 are preferably produced by machining the shell 220 or molded in one piece with it, to be more precise a shell 220 here produced as in the prior art.

As may be seen in FIG. 1, the shell 220 has at the front an edge identical to the rear edge 138 but which could be omitted if there were no longer any reason for the presence of the second fixing means 240.

Between two consecutive studs 254 the shell 220 has a notch 257 adapted to allow the second elements 256 to pass through it when they occupy the release position.

The second elements 256 connected to the actuator member 242 are preferably constituted by blocks.

The blocks 256 are advantageously carried by the actuator member 242 so that the blocks 256 are constrained to move, here without play like the upper hook 56, with said member 242 when the latter slides vertically between the fixing and release positions.

Each block 256 preferably includes a threaded hole to enable it to be mounted by screwing it onto the threaded rod forming the actuator member 242.

The blocks 256 are of parallelepiped overall shape, for example. Each block 256 includes in particular a longitudinally oriented vertical external face 260e called the retaining face and transversely opposite it an internal vertical face 260i called the clamping face.

The external vertical face 260e is advantageously plane and the internal vertical face 260i is advantageously convex, having a domed profile.

The second fixing means 240 include a support 265 in the form of a rack that has a vertically oriented main part from the external face of which extend transverse parts 267.

The support 265 is preferably rigidly fixed to the shell-carrier 222 by fixing members 271, such as screws, that pass through the support 265, here through transversely oriented holes 273 that open onto the free edge of the parts 267.

The transverse parts 267 of the support 265 each include another vertically oriented hole 275 which, offset longitudinally relative to the hole 273, has the actuator member 242 passed through it.

However, the actuator member 242 has an inside diameter allowing free sliding in the vertical direction relative to the support 265 over a travel corresponding at least to the movement between the fixing and release positions.

The parts 267 of the support 265 define between them a U-shaped recess in which a block 256 is received in the mounted position and then in the fixed position. Each recess has an oblique vertical face 277 disposed transversely facing the convex clamping face 260i of each block 256.

The oblique face 277 forms a ramp adapted to cooperate with the clamping face 260i and has a slope such that the recess for the block 256 that it delimits transversely with the shell-carrier 222 becomes smaller in the vertical direction when the block 256 slides downward in the vertical direction.

As shown in FIG. 17, in the fixing position of the second fixing means 240, each block 256 forming the second element cooperates on the one hand via its retaining face 260e with the bearing face 254i of the studs 254 carried by the shell 220 and on the other hand via its clamping face 260i with the oblique face 277 of the support 265.

Thanks to this, the cooperation between the retaining face 260e and the bearing face 254i guarantees fixing of the shell 220 to the shell-carrier 222 with application of a clamping force which, the result of cooperation between the clamping face 260i of the block and the oblique face 277 of the support 265, is adapted to press the external face 226 of the shell against the internal face (not visible) of the shell-carrier 222.

As shown in FIG. 18, which shows the release position of the second fixing means 240, the rotors 256 are offset vertically upward so that the retaining faces 260e of the blocks 256 are positioned transversely to coincide with the notches 257 and thus no longer cooperate with the associated bearing faces 254i of the studs 254.

The drive system 248 is advantageously adapted to load the actuator member 242 selectively to cause movement of the actuator member 242 of the second fixing means 240 between the fixing and release positions.

Th% drive system 248 is preferably constituted by a toggle clamp.

Such a device 248 is adapted to transform rotation movement into translation movement, here vertical sliding movement.

The drive system 248 advantageously includes a fixing bracket 290 by means of which it is permanently mounted on the plate 263 of each shell-carrier 222 of the drive system 248.

The drive system 248 includes a lever 210, here provided with a handle, that is mounted to rotate between at least a first position and a second position about a shaft A carried by the bracket 290.

The first position of the drive system 248 shown in FIG. 17 corresponds to the fixing position of the second fixing means 240 and the second position shown in FIG. 18 corresponds to the release position of said means 240.

The lever 210 of the system 248 is connected to the lower end of a rod 206 forming actuator means and the other, upper end of which is advantageously connected to move with the lower end of the actuator member 242 of the second fixing means 240.

As may be seen by comparing FIGS. 19 and 20, when the lever 210 is moved to rotate 180° as indicated diagrammatically by an arrow F1 from its first position (FIG. 19) corresponding to the fixing position to its second position (FIG. 20) corresponding to the release position, the rod 206 is moved vertically upward as shown by the arrow F2 in FIG. 20.

In the first position the lower end of the rod 206 connected to the lever 210 extends vertically below the shaft A while in the second position this same end extends above the rotation axis A.

By comparison with the first embodiment, the fixing means 240 of the second embodiment include no locking system and the actuator member 242 is not returned automatically toward the fixing position by spring return means.

Moreover, because of the presence of the first fixing means 140 and by comparison with the first embodiment the introduction of the shell 220 into the shell-carrier 222 is not effected by a movement in translation that is globally in the transverse direction.

Consequently, of the mold changing methods described above with reference to the first embodiment of the fixing means 40, only the first mold changing method may be used, i.e. the method beginning by opening the molding device 10 and in which the shells are demounted successively, one after the other.

However, this would not be the case if the rear and front edges of the shell 220 and of the shell-carrier 222 were provided with second fixing means 240 because the fixing means could then be actuated when the mold-carriers 14 are in the closed position and by completely releasing each shell 220, which would no longer be fixed to the shell-carrier 222.

The operation of the fixing means 240 of the second embodiment is described next during the execution of the mounting and demounting steps to change a mold by a method that is globally similar to the first method described above.

For the demounting phase of the method, the first step (a) consists in opening the molding device 10, i.e. causing the mold-carriers 14 to pivot about the axis O from the closed position to the open position.

As indicated above, a drive system 48 formed a toggle clamp is permanently mounted on each shell-carrier 220 of the molding device 10 so that, compared to the first method, no step of attaching or placing any such device is required.

Similarly, in the absence of any locking system, the step of unlocking the system does not apply in the fixing means of the second embodiment.

In a second step (b), the fixing means 240 are moved from the fixing position toward the release position by the drive system 248.

To this end, the operator actuates the lever 210 manually in order to cause it to pivot 108° about the rotation shaft A from its first position to its second position.

As the lever 210 travels toward the second position, the rod 206 slides vertically upward and loads the actuator member 242 in such a manner as to cause said member 242 to slide from its fixing position toward its release position.

In the absence of a return spring for the actuator member 242, the release position of the second fixing means 240 is a stable position such that, compared to the first method, no locking of the actuator member is necessary.

Note that, compared to the first method, the second fixing means 240 do not include any unsticking means either.

The various steps relating to the demounting phase of the mold changing method that has just been described are advantageously performed by a single operator who, when the second fixing means 240 are in the release position, is free to be able to demount the shell.

In a third step (c) the shell 220 is demounted by the operator.

To proceed to its removal, the operator grasps the shell 220 and causes it to perform a circular rotation movement relative to the shell-carrier 222, the rotation movement being effected from the rear toward the front so as to remove first the released front edge of the second fixing means 240 and then the rear edge 138 that is disengaged in this way from the first fixing means 140.

The steps of the method that have just been described are advantageously then repeated to demount the other shell 220.

Of course, apart from demounting each of the shells 220, the operator also proceeds in a preliminary step to demount the mold bottom 34 when the mold includes such a bottom and in this case this step is advantageously executed as soon as the mold-carriers 14 are opened.

To mount a new shell 220 in each shell-carrier 222 when the molding device 10 is in the open position, the operator executes the following steps that correspond to the steps described above executed in reverse order.

For the mounting phase of the mold changing method, the operator proceeds in a fourth step (d) to introduce a shell 220 by a circular movement from the front toward the rear so as first to engage the edge 138 in the first fixing means 140.

In a fifth step (e), the second fixing means 240 are actuated to move them from the release position toward the fixing position.

In the second embodiment, the operator moves the lever 210 of the drive system 248 from its second position (FIGS. 18 and 20) toward its first position (FIGS. 17 and 19), thus causing simultaneously downward sliding of the rod 206 and the actuator member 242 until the blocks 256 reach the fixing position.

In the fixing position, the retaining face 260e of each block 256 cooperates with the bearing face 254i of each stud 254, thereby exerting on the shell 220 an essentially transverse force oriented from the interior toward the exterior.

In the second embodiment, the faces 260e and 254i are advantageously plane to optimize the force application area and the clamping force is obtained by virtue of the cooperation between the convex faces 260i of the blocks and 277 of the support 265.

Alternatively, the studs 254 and the blocks 256 are conformed with complementary faces adapted to cooperate wedging fashion so as to effect with only two faces both the locking of the shell 220 into the shell-carrier 222 and the clamping to press on the external face 226 of the shell 220.

Either backing up or in combination with first fixing means 140, the second fixing means 240 of the invention advantageously enable further reduction of the intervention time of at least one operator who proceeds successively to demount and mount the shells 220.

It is clear from the description that has just been given that the second fixing means 240 are actuated in a particularly simple and fast manner by acting on the lever 210 of the drive system 248.

Consequently, the second fixing means 240 of the invention enable further reduction of the total time necessary to change a mold on a molding device 10.

Clearly, in the procedure as just described, when the molding device 10 is in the open position and the shells 220 are mounted or demounted successively one after the other in order to enable an operator to remove or introduce each of them into the shell-carrier 222.

However, an automated mold changing method that is even faster may be obtained by disposing second fixing means 240 on each of the edges and not on only one of them.

Such a method would then be similar to the second method described above in relation to the first embodiment and the drive system 248 advantageously backed up with a common lever 210 for commanding simultaneously the release of each of the second fixing means.

A third embodiment of fixing means for a molding device of the invention as shown in FIGS. 21 and 22 is described next.

The description of the third embodiment of the fixing means has the advantage of being compared to the first embodiment.

Thus elements having similar, analogous or identical functions are designated by the same reference numbers with the exception of the fixing means 40 the elements of which are designated by references beginning 300.

FIG. 21 shows a molding device 10 of the "book-like opening" type for a "rotary" type machine for manufacturing thermoplastic material containers from pre-heated preforms.

The molding device 10 therefore includes two mold-carriers (not shown) that are mounted to be mobile relative to each other about a rotation axis O between an open position and a closed position.

The molding device 10 further includes two half-molds which here, as previously, are produced in two separate parts, namely a shell 20 including the half-print of the container to be produced and an associated shell-carrier 22 adapted to carry said shell and that is fixed in demountable manner to the shell-carrier 22 by the fixing means 40 of the invention.

The fixing means 40 are mounted to be mobile between at least a fixing position and a release position and include at least a first fixing element 54 and a second fixing element 56.

In this third embodiment, the fixing means 40 include at least one actuator member 42 for actuating the fixing means that is adapted to be actuated from outside the molding device 10 regardless of the open or closed position of the device.

Fixing means 40 of the third embodiment are disposed between each of the edges 300 of the shell-carrier 22 and the edges 28 of the shell 20.

An actuator member 42 is therefore carried by each of the two edges 300 of each shell-carrier 22 in a recess 44 of which the actuator member 42 is mounted to be able to slide, here in the vertical direction.

The recess 44 is open transversely and closed by an element such as a plate 302 that is fixedly attached, for example screwed, to the edge 300, notably to enable mounting and retention of the actuator member 42.

The actuator member 42 is adapted to be moved selectively between said fixing and release positions by a drive system 48.

Each actuator member 42 advantageously has its own associated drive system 48 constituted here of an actuator, preferably a pneumatic piston-and-cylinder actuator mounted permanently on one side of the bracket 63.

Each actuator 48 can be selectively actuated to cause the actuator member 42 to slide between the fixing and release positions.

The actuators 48 are preferably actuated synchronously for at least one shell 20 in order to enable use of the first method described above in which the shells 20 are demounted successively when the molding device 10 is in the open position.

The actuators 48 are advantageously actuated successively or simultaneously when the molding device 10 is in the closed position and before it is opened in order to enable removal of a unitary subassembly by the second mold changing method described above.

The actuator member 42 for the fixing means 40 preferably carries the first fixing elements 54 constituted by male type elements while the second fixing elements 56 complementary to the first elements 54 are preferably carried by the shell (or half-mold) 20.

Thus said at least one element for rigidly fixing each shell 20 or half-mold is a second fixing element 56 of female type, such as a detent or a notch, while said at least one other fixing element connected to the actuator member 42 is a first fixing element 54 of male type, such as a lug.

Compared to the first embodiment, the male/female type elements are therefore reversed and the second fixing elements 56 of female type are advantageously carried by the shell 20.

The recessed second elements 56 are for example produced in the form of at least one detent or at least one notch disposed on the edge 28 of the shell 20, obtained notably by machining the cylindrical face 26 of the shell 20.

Thus in this third embodiment, as in the second embodiment, the shells 20 or half-molds that are frequently manipulated during mold changing operations are, compared to the first embodiment, free of all projecting parts that are naturally more exposed to impacts in particular.

When the female element corresponding to the first fixing element 54 is associated with each shell 20 (or a half-mold), it is preferably still possible to provide at least two different types of female element.

The same shell may advantageously include two different types of female element at the level of its edge 28 or the cylindrical face adjacent said edge 28.

A mold (formed of two shells 20) is then adapted to be mounted on and demounted from a given molding device 10 of a machine equipped with a first type of fixing means or another given molding device of another rotary machine equipped with a second type of fixing means, each fixing means including respective different "male" second fixing elements.

Thanks to this, the same molding device offers multipurpose use in at least two different molding devices, forming one of the stations of a "rotary" machine for manufacturing thermoplastic material containers from preforms.

The actuator member 42 preferably includes a spring member 58 adapted to return the actuator member 42, to which the first fixing element 54 are connected, automatically toward the fixing position in which each first element 54 cooperates with a second element 56 to fix the shell 20 to the shell-carrier 22 (or the mold to the mold-carrier if the mold is a one-piece mold).

The actuator member 42 may be locked in position by the actuator 48.

An actuator 48 of the single-acting pneumatic piston-and-cylinder type is advantageously able to lock the actuator member 42 in the release position, the actuator 48 exerting permanently on the drive part 46 of the actuator member 42 a force greater than the force of the spring forming the spring return member 58.

A double-acting pneumatic piston-and-cylinder type actuator 48 is advantageously used to provide double locking of the actuator member 42, both in the release position and in the fixing position.

Each actuator member 42 preferably includes at least two first fixing elements 54 of male type and means for taking up play, such as a spring 58, are preferably provided between one of the elements 54 and the actuator member 42.

FIG. 22 is a detail view of the fixing means 40 previously shown in an exploded view in FIG. 21 for one edge only, the fixing means 40 being represented in the fixing position with the molding device 10 in the closed position.

The first fixing element 54, here the upper one, carried by the actuator member 42, is of parallelepiped general shape.

The first element 54 preferably includes primarily a locking lug 304 and two lateral locking faces 306.

The locking lug 304 has a curvilinear, globally V-shaped, profile that is received in a complementary recess 308 of the detent forming the second fixing element 56 produced in the shell 20.

The detent 56 further includes a horizontal, globally plane face 310 through which the locking lug 304 passes when the first fixing element 54 is moved with the actuator member 42 driven by the actuator 48 between the fixing and release positions, corresponding to the lug 54 entering or leaving the detent 56.

When the first element 54 cooperates with the second element of the fixing means 40 to hold the shell 20 in position in the shell-carrier 22, the shell 20, which opposes the forces applied by the fixing means 40, exerts on the latter, and more particularly on the actuator member 42, via the first elements 54 that are connected to it, forces that tend to cause rotation movement and consequently torsion stresses.

The fixing device of the molding device 10 thus advantageously includes rotation locking means adapted to lock rotation of the actuator member 42 to oppose said torsion forces loading the actuator member 42.

The fixing means 40 preferably include rotation locking means adapted here to lock the first fixing elements 54 carried by the actuator member 42 and constrained to rotate therewith to neutralize said torsion forces which, failing this, would be applied to the actuator member 42.

The means for locking rotation of the actuator member 42 are preferably constituted by the opposite vertical faces 306 of each first element 54 which, in the fixing position, respectively cooperate with a bearing face 312 of the edge 300 adjacent the recess 44 and with a portion of a face 314 of the element formed by the plate 302 in plate or bar form.

A part 306 of the means for locking rotation of the actuator member 42 is advantageously connected to said member to move therewith and adapted to cooperate with another part 312, 314 rigidly fastened to the mold-carrier 14.

The invention claimed is:

1. A molding device (10) for a machine for manufacturing thermoplastic material containers by forming a pre-heated preform by means of a pressurized fluid, the molding device (10) comprising:
   two mold-carriers (14) mounted to be mobile relative to each other about a rotation axis (O) between an open position and a closed position,
   two half-molds (20, 220, 22, 222) which, each provided with a half-imprint (21) and carried by a mold-carrier (14), are mounted in the respective associated mold-carriers (14), and
   fixing means (40, 140, 240) adapted to fix each half-mold (20, 220) occupying a mounted position in a demountable manner to the mold-carrier (14), wherein
   the means (40, 240) for fixing each half-mold (20, 220) to the mold-carrier (14), mounted to be mobile between at least a fixing position and a release position, include at least one actuator member (42, 242) that is carried by the molding device (10), and
   said at least one actuator member (42, 242) for the fixing means (40, 240) is adapted to slide vertically to drive the fixing means (40, 240) between said positions when the mold-carriers (14) are in the closed position.

2. The device according to claim 1, wherein said at least one member (42, 242) for actuating the fixing means is adapted to be driven in movement from outside the molding device (10) to cause the fixing means (40, 240) to release each half-mold (20) from the mold-carrier (14) or to fix each half-mold (20) thereto regardless of the open or closed position of the mold-carriers (14) of the molding device (10).

3. The device according to claim 1, wherein the respective fixing means (40) are at least in part integrated into the interior of the molding device (10) and are disposed between an edge (28) of the half-mold (20) and an edge of the mold-carrier (14) that are parallel to the rotation axis (O) in such a manner as to fix the half-mold (20) to one and/or the other of edges (28).

4. The device according to claim 3, wherein the member (42, 242) for actuating the fixing means (40, 240) is adapted to be driven selectively by a drive system (48, 248) to cause the member to slide between at least said fixing and release positions of each half-mold (20, 220).

5. The device according to claim 4, wherein the respective fixing means (40, 240) include at least one fixing element that is rigidly fastened to each half-mold (20, 220) and at least one other fixing element, complementary to said element, is adapted to be moved by the actuator member (42, 242).

6. The device according to claim 5, wherein said at least one fixing element rigidly fastened to each half-mold (20, 220) is a first fixing element (54, 254) of male type and said at least one other fixing element connected to the actuator member (42, 242) is a second fixing element (56, 256) of female type.

7. The device according to claim 5, wherein said at least one fixing element rigidly fastened to each half-mold (20, 220) is a second fixing element (56, 256) of female type and in that said at least one other fixing element connected to the actuator member (42, 242) is a first fixing element (54, 254) of male type.

8. The device according to claim 5, wherein the actuator member (42, 242) includes at least two fixing elements (54, 56) one of which is connected to said member (42, 242) with a spring member (58) disposed between them to form a connection with play adapted to guarantee correct positioning of each element with the associated other complementary element.

9. The device according to claim 5, wherein the drive system (48, 248) is adapted to load the actuator member (42, 242) to cause selective movement of said actuator member (42, 242) between at least:
   the fixing position in which the second element (56, 256) cooperates with the first element (54, 254) of the half-mold (20, 220) in order to fix the half-mold (20, 220) and the mold-carrier (14) by pressing the half-mold (20, 220) against the mold-carrier (14), and
   the release position in which the second element (56, 256) is retracted in order not to interfere with the first element (54, 254) of the half-mold (20, 220), in particular when the half-mold (20, 220) occupies said mounted position.

10. The device according to claim 9, wherein the fixing means (40) include elastic return means (52) that urge the actuator member (42) toward the fixing position so that said member (42) is returned automatically toward said fixing position.

11. The device according to claim 10, wherein the molding device (10) includes a locking system (62) associated with the fixing means (40) which is actuated selectively to lock the actuator member (42) including the second element (56) of the fixing means (40) in the fixing position or the release position.

12. The device according to claim 11, wherein the locking system (62) includes drive means (82) adapted to cause movement of at least one locking latch (72) that is mounted to be mobile between:
   an unlocked position in which the locking latch (72) is retracted to leave the actuator member (42) free to slide, notably between the fixing and release positions, and
   a locked position in which the locking latch (72) cooperates selectively with a first detent (64) or with a second detent (66) of the actuator member (42), said first and second detents (64, 66) respectively corresponding to the fixing position and the release position of the actuator member (42).

13. The device according to claim 12, wherein the second detent (66) of the actuator member (42) and the locking latch (72) are conformed to have, in the sliding direction, play adapted to allow movement of the member (42) beyond the release position in order selectively to drive via the drive system (48) means (88) for unsticking the half-mold (20) from the mold-carrier (14).

14. The device according to claim 13, wherein the unsticking means (88) are constituted by part of the second element (56) forming a ramp that is adapted to exert an unsticking force on the first element (54) when the drive system (48) loads the actuator member (42) to cause the actuator member (42) to slide beyond the release position by an overtravel determined by said play of the locking latch (72) in the second detent (66).

15. The device according to claim 2, wherein the molding device (10) includes rotation locking means adapted to lock rotation of the actuator member (42, 242).

16. The device according to claim 2, wherein the respective fixing means (40) are at least in part integrated into the interior of the molding device (10) and are disposed between an edge (28) of the half-mold (20) and an edge of the mold-carrier (14) that are parallel to the rotation axis (O) in such a manner as to fix the half-mold (20) to one and/or the other of its edges (28).

17. The device according to claim 6, wherein the actuator member (42, 242) includes at least two fixing elements (54, 56) one of which is connected to said member (42, 242) with a spring member (58) disposed between them to form a connection with play adapted to guarantee correct positioning of each element with the associated other complementary element.

18. The device according to claim 7, wherein the actuator member (42, 242) includes at least two fixing elements (54, 56) one of which is connected to said member (42, 242) with a spring member (58) disposed between them to form a connection with play adapted to guarantee correct positioning of each element with the associated other complementary element.

19. The device according to claim 6, wherein the drive system (48, 248) is adapted to load the actuator member (42, 242) to cause selective movement of said actuator member (42, 242) between at least:

the fixing position in which the second element (56, 256) cooperates with the first element (54, 254) of the half-mold (20, 220) in order to fix the half-mold (20, 220) and the mold-carrier (14) by pressing the half-mold (20, 220) against the mold-carrier (14), and the release position in which the second element (56, 256) is retracted in order not to interfere with the first element (54, 254) of the half-mold (20, 220), in particular when the half-mold (20, 220) occupies said mounted position.

20. The device according to claim 7, wherein the drive system (48, 248) is adapted to load the actuator member (42, 242) to cause selective movement of said actuator member (42, 242) between at least:

the fixing position in which the second element (56, 256) cooperates with the first element (54, 254) of the half-mold (20, 220) in order to fix the half-mold (20, 220) and the mold-carrier (14) by pressing the half-mold (20, 220) against the mold-carrier (14), and the release position in which the second element (56, 256) is retracted in order not to interfere with the first element (54, 254) of the half-mold (20, 220), in particular when the half-mold (20, 220) occupies said mounted position.

* * * * *